(12) United States Patent
Hu et al.

(10) Patent No.: US 12,501,439 B2
(45) Date of Patent: Dec. 16, 2025

(54) MECHANISM FOR INTER-UE COORDINATION FOR SIDELINK DRX UE

(71) Applicant: LENOVO (BEIJING) LIMITED, Beijing (CN)

(72) Inventors: Jie Hu, Beijing (CN); Jing Han, Beijing (CN); Haiming Wang, Beijing (CN); Lianhai Wu, Beijing (CN); Min Xu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 332 days.

(21) Appl. No.: 18/261,430

(22) PCT Filed: Jan. 14, 2021

(86) PCT No.: PCT/CN2021/071833
§ 371 (c)(1),
(2) Date: Jul. 13, 2023

(87) PCT Pub. No.: WO2022/151191
PCT Pub. Date: Jul. 21, 2022

(65) Prior Publication Data
US 2024/0073907 A1 Feb. 29, 2024

(51) Int. Cl.
*H04W 72/21* (2023.01)
*H04L 1/08* (2006.01)
*H04W 72/232* (2023.01)

(52) U.S. Cl.
CPC .............. *H04W 72/21* (2023.01); *H04L 1/08* (2013.01); *H04W 72/232* (2023.01)

(58) Field of Classification Search
CPC ........ H04W 72/21; H04W 72/232; H04L 1/08
(Continued)

(56) References Cited

U.S. PATENT DOCUMENTS

| 2019/0327753 | A1 | 10/2019 | Lee et al. | |
| 2021/0185761 | A1* | 6/2021 | Narula | ............... H04L 41/0803 |
| 2021/0243836 | A1* | 8/2021 | Wu | ...................... H04W 76/14 |

FOREIGN PATENT DOCUMENTS

| CN | 111480391 | A | * | 7/2020 | ........... H04W 72/25 |
| CN | 111800894 | A | * | 10/2020 | ......... H04W 52/028 |

OTHER PUBLICATIONS

International Searching Authority, "Written Opinion of the International Searching Authority," PCT/CN2021/071833, Oct. 21, 2021, pp. 1-3.
(Continued)

*Primary Examiner* — Intekhaab A Siddiquee
(74) *Attorney, Agent, or Firm* — Kunzler Bean & Adamson

(57) ABSTRACT

Embodiments of the present disclosure relate to inter-user equipment coordination for sidelink discontinuous reception (DRX) UE. The method includes transmitting, to a second terminal device, a configuration information of discontinuous reception (DRX) associated with at least one of the first terminal device or a third terminal device. The method also includes receiving, from the second terminal device, a resource information indicating a first set of resources allocated for a sidelink communication between the first terminal device and the third terminal device. The method further includes determining a second set of resources for performing the sidelink communication based on the first set of resources and the configuration information.

20 Claims, 7 Drawing Sheets

(58) Field of Classification Search
USPC .......................................................... 370/329
See application file for complete search history.

(56) References Cited

OTHER PUBLICATIONS

LG Electronics, "Discussion on physical layer design considering sidelink DRX operation", 3GPP TSG RAN WG1 #103-e R1-2007897, Oct. 26-Nov. 13, 2020, pp. 1-15.

* cited by examiner

MECHANISM FOR INTER-UE COORDINATION FOR SIDELINK DRX UE

FIELD

The present disclosure relates generally to wireless communications, and more particularly to wireless communications systems, devices, methods, and computer readable medium for inter-UE coordination for sidelink discontinuous reception (DRX) UE.

BACKGROUND

The "background" description provided herein is for the purpose of generally presenting the context of the disclosure. Work of the presently named inventors, to the extent it is described in this background section, as well as aspects of the description which cannot otherwise qualify as prior art at the time of filing, are neither expressly or impliedly admitted as prior art against the present invention.

With developments of communication technologies, a technology named "DRX" has been proposed in order to save power. DRX is a technique that allows a User Equipment (UE) to turn off its transceiver for a duration of a DRX cycle when there are no packets to be received. In other words, within such duration, the UE does not need to receive the packet and does not performing monitoring on channels. Further, a technology of sidelink communication has been proposed that allows direct communication between UEs without going through a network device, where utilized resources can be scheduled by a network device or by a terminal device. For the purpose of improving reliability of such communication, inter-UE coordination is introduced when the resources are scheduled by the terminal device. However, there are no solutions on inter-UE coordination when the UE is configured with sidelink DRX.

The term "DRX" used herein refers to a method used in mobile communication to conserve the battery of the mobile device. The mobile device and the network negotiate phases in which data transfer occurs. During other times the device turns its receiver off and enters a low power state. The "resources" used herein comprises resources in frequency domain and resources in time domain which can be used for transmission between communication devices. The term "sidelink" refers to a slink between two terminal devices, which enables device-to-device communications. The term "on-duration" used herein refers to a time period during which the terminal device is able to monitor a sidelink channel, for example, a physical sidelink control channel (PSCCH) or a physical sidelink shared channel (PSSCH) and receive data or control information on the sidelink channel. The term "DRX period" or "opportunity for DRX" or "off-duration" used herein refers to a time period during which the terminal device does not monitor the sidelink channel and does not receive data or control information on the sidelink channel. The term "DRX cycle" used herein comprises an on-duration during which the terminal device should monitor the sidelink channel and a DRX period during which the terminal device can skip reception of sidelink channels. The term "active-duration" used herein refers to a time period during which the terminal device is active and should monitor the sidelink channel. The active-duration can comprise one or more on-durations. The active-duration can also comprise one or more time durations of one or more active timers which can control reception of the terminal device. The term "inactive-duration" used herein refers to a time period during which the terminal device is inactive and does not perform reception of sidelink channels. The inactive-duration can comprise one or more DRX periods.

SUMMARY

In general, example embodiments of the present disclosure provide a solution for inter-UE coordination for sidelink DRX UE.

An exemplary embodiment of the present disclosure provides a method performed by a first terminal device. The method includes transmitting, to a second terminal device, a configuration information of discontinuous reception (DRX) associated with at least one of the first terminal device or a third terminal device. The method also includes receiving, from the second terminal device, a resource information indicating a first set of resources allocated for a sidelink communication between the first terminal device and the third terminal device. The method further includes determining a second set of resources for performing the sidelink communication based on the first set of resources and the configuration information.

An exemplary embodiment of the present disclosure provides a method of performed by a second terminal device. The method comprises receiving, from a first terminal device, a configuration information of discontinuous reception (DRX) associated with at least one of the first terminal device or a third terminal device. The method also comprises determining, based on the configuration information, a first set of resources allocated for a sidelink communication between the first terminal device and the third terminal device. The method further comprises transmitting, to the first terminal device, a resource information indicating the first set of resources.

An exemplary embodiment of the present disclosure provides a first terminal device. The first terminal device includes a processor; and a memory coupled to the processor and storing instructions thereon, the instructions, when executed by the processor, causing the first terminal device to perform the method according to the first aspect.

An exemplary embodiment of the present disclosure provides a second terminal device. The second terminal device includes a processor; and a memory coupled to the processor and storing instructions thereon, the instructions, when executed by the processor, causing the second terminal device to perform the method according to the second aspect.

In a fifth aspect, there is provided a computer readable medium having instructions stored thereon, the instructions, when executed on at least one processor, causing the at least one processor to carry out the method according to the first aspect.

In a sixth aspect, there is provided a computer readable medium having instructions stored thereon, the instructions, when executed on at least one processor, causing the at least one processor to carry out the method according to the second aspect.

This Summary is provided to introduce a selection of embodiments described herein in simplified forms that are further described below in the Detailed Description along with other embodiments. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

The term "UE" can be interchanged in this specification with the broader term "electronic device" and vice versa.

BRIEF DESCRIPTION OF THE DRAWINGS

The scope of the present disclosure is best understood from the following detailed description of exemplary embodiments when read in conjunction with the accompanying drawings, wherein.

Figure 1A:
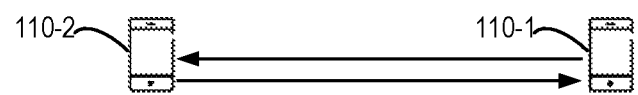
FIGS. 1A and 1B illustrate system diagrams of inter-UE coordination according to conventional technologies, respectively.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service.

Abbreviations

| | |
|---|---|
| 3GPP | 3$^{rd}$ Generation Partnership Project |
| CN | Core Network |
| UE | User Equipment |
| DRX | Discontinuous Reception |
| RRC | Radio Resource Control |
| WTRUs | Wireless Transmit/Receive Units |
| SL | Sidelink |
| TX | Transmitting |
| RX | Receiving |
| MAC | Medium Access Control |
| PHY | Physical Layer |

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices or evolved MTC (eMTC) devices, devices on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" can be used interchangeably.

Communication discussed herein can conform to any suitable wireless interface standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, such communication can be performed according to any communication protocol either currently known or to be developed in the future. Examples of the communication protocols include, but are not limited to, the first generation (1G), the second generation (2G), 2.5G, 2.75G, the third generation (3G), the fourth generation (4G), 4.5G, the fifth generation (5G) communication protocols. The techniques described herein can be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like can refer to different or same objects. Other definitions, explicit and implicit, can be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As mentioned above, resources for sidelink communications can be scheduled by a network device, which is referred to as mode 1. On the other hand, resources for sidelink communication can also be determined by UE itself, which is referred to as mode 2. Specifically, as a sidelink communication enhancement, the inter-UE coordination is proposed for mode 2 resource allocation to improve reliability where one of the UEs determines a set of resources and transmits such set of resources to another UE which takes them into consideration when performing resource selection for its own transmission. FIG. 1A illustrates an exemplary schematic diagram of a system where inter-UE coordination for sidelink UE is performed between a pair of UEs. As shown in FIG. 1A, UE 110-1 and UE 110-2 can perform sidelink communications with each other, each UE can act as either a transmitting (TX) UE or a receiving (RX) UE. For example, in the case where the UE 110-2 acts as a RX UE, when performing inter-UE coordination, the UE 110-2 can provide a set of resources to its peer UE, i.e. the TX UE 110-1. In this example, the UE 110-2 is being referred to as an assisting UE while the UE 110-1 is referred to as an assisted UE.

Figure 1B:
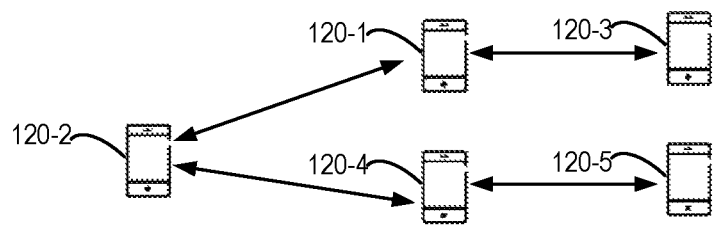

FIG. 1B, on the other hand, illustrates an exemplary schematic diagram of a system where an inter-UE coordination is performed between a third UE and a pair of UEs involved in a sidelink communication. For example, as shown in FIG. 1B, UE 120-1 and UE 120-3 can perform sidelink communications with each other, as well as, UE 120-4 can perform sidelink communications with UE 120-5. On the other hand, UE 120-2 is not involved in sidelink communication, but instead, acts as an assisting UE to allocate resources for the sidelink communications between the UE 120-1 and the UE 120-3, as well as, the UE 120-4 and the UE 120-5. Only for the purpose of illustrations, for the sidelink communication between the UE 120-1 and the UE 120-3, the UE 120-1 can be regarded as a transmitting (TX) UE and the UE 120-3 can be regarded as a receiving (RX) UE. As shown in FIG. 1B, the UE 120-2 can allocate resources for the sidelink communications between the UE 120-1 and the UE 120-3 and the UE 120-2 can transmit information for the allocated resources to the UE 120-1. In this situation, the UE 120-2 is referred to as an assisting UE and the UE 120-1 is referred to as an assisted UE. For the sidelink communication between the UE 120-4 and the UE 120-5, the UE 120-4 can be regarded as a TX UE and the UE 120-5 can be regarded as a RX UE. In this case, the UE 120-2 can allocate resources for the sidelink communications between the UE 120-4 and the UE 120-5 and the UE 120-2 can transmit information for the allocated resources to the UE 120-4. In this situation, the UE 120-2 is referred to as an assisting UE and the UE 120-4 is referred to as an assisted UE. The term "TX UE" used herein can refer to a UE which can transmit data to another UE when performing sidelink communications with the other UE. The term "RX UE" used herein can refer to a UE which can receive data from another UE when performing sidelink communications with the other UE. The term "assisting UE" used herein can refer to a UE which can allocate resources for sidelink communications between UEs. The term "assisted UE" used herein can refer to a UE which can request another UE for allocating resources for sidelink communications. In other words, the TX UE can transmit sidelink data to the RX UE and the RX UE can receive sidelink data from the TX UE.

Additionally, in exemplary embodiments illustrated in FIG. 1A and FIG. 1B, UEs involved in sidelink communication also implement a DRX technique. Hence, there may be some issues with inter-UE coordination when UEs involved in sidelink communication are being configured to support DRX. For example, if an assisting UE, for example the UE 120-2, provides a preferred (candidate) set of resources for SL communication to an assisted UE(s), for example the UEs 120-1 and/or 120-4, respectively, which act as the TX UE(s) in sidelink communication, the assisting UE may determine such preferred set of resources as such that it coincides with the same time as an inactive time period of a DRX cycle implemented by the assisted UE(s), wherein the preferred set of resources can consist of at least one resource. In this case, the assisted UE(s) cannot perform sensing on the preferred set of resources determined by the assisting UE. The term "sensing" used herein can refer to a process where a UE monitors a set of resources to identify if the set of resources is being used by other UEs based on the received sidelink control information (SCI) transmitted on physical sidelink control channel (PSCCH) from other UEs. For example, the assisted UE (for example, the UEs 120-1 and/or 120-4) cannot check availability of the preferred set resources determined by the assisting UE (for example, the UE 120-2) based on received SCI information from other UEs, since the assisted UE (for example, the UEs 120-1 and/or 120-4) is in the inactive time period of the implemented DRX cycle and does not monitor a PSCCH which SCI is transmitted on. In another situations, the assisting UE may determine the preferred set of resources that coincides with the same time as an inactive time period of a DRX cycle implemented by the sidelink peer UE(s) of assisted UE(s), which act as the RX UE (for example, the UEs 120-3 and/or 120-5) in sidelink communication. Similarly, in this case, the sidelink RX UE cannot perform reception on the preferred set of resources. Moreover, when the preferred set of resources determined to be used for SL communication during the inactive time of a DRX cycles implemented by one or both the sidelink TX and RX UEs is not included when performing inter-UE coordination, an available resource set that remains for SL transmission will be significantly reduced leading to resource collision during an active time duration of the DRX cycle.

In order to solve at least part of the above-described issues, solutions on inter-UE coordination, when a UE is configured with a sidelink DRX technique, are proposed. According to embodiments of the present disclosure, a first terminal device (e.g., an assisted UE) transmits configuration information of a DRX technique associated with the first terminal device and one or more third terminal devices (e.g., the sidelink RX UE) to a second terminal device (i.e., an assisting UE). The second terminal device determines a first set of resources to be used for sidelink communications between the first terminal device and the one or more third terminals device based on the configuration information received. The second terminal device transmits resource information to the first terminal device indicating the first set of resources. The first terminal device determines a second set of resources to be used for sidelink communication with the one or more third terminals device based on the first set of resources received and the configuration information. In this way, resource collision can be avoided.

Some example embodiments of the present disclosure will be described in detail below with reference to FIGS. 2-7.

Example Communication System and Networks

Figure 2:
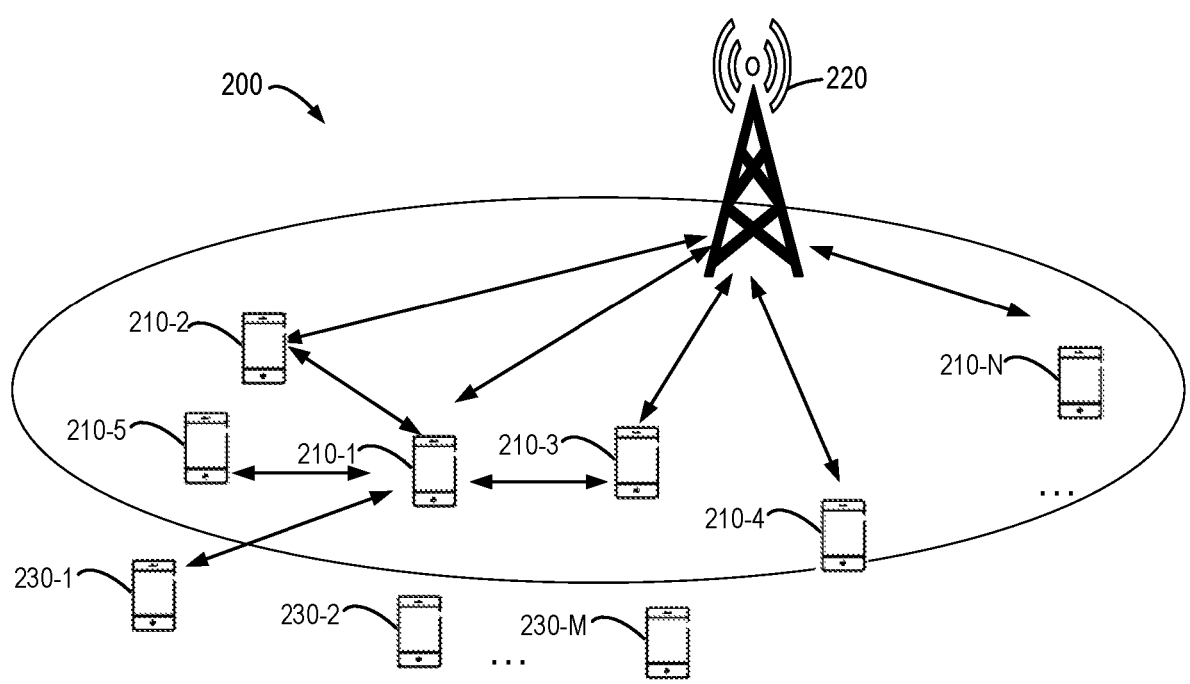
FIG. 2 illustrates a schematic diagram of a communication system in accordance with an exemplary embodiment.

FIG. 2 illustrates a schematic diagram of a communication system 200 in which embodiments of the present disclosure can be implemented. The communication system 200, which is a part of a communication network, comprises a terminal device 210-1, a terminal device 210-2, a terminal device 210-3, a terminal device 210-4, a terminal device 210-5, . . . , a terminal device 210-N, which can be collectively referred to as "terminal device(s) 210." The number N can be any suitable integer number.

The communication system 200 further comprises a network device 220. For example, the network device can be gNB. In the communication system 200, the network devices 220 and the terminal devices 210 can communicate data and control information to each other. The terminal devices 210 can also perform sidelink communications with each other. The numbers of terminal devices and network devices shown in FIG. 2 are given for the purpose of illustration without suggesting any limitations. In addition, the communication system 200 can comprise a terminal device 230-1, a terminal device 230-2, . . . , a terminal device 230-M, which can be collectively referred to as "terminal device(s) 230." The number M can be any suitable integer number. The terminal devices 230 can perform sidelink communications with each other as well as terminal devices 210. As shown in FIG. 2, the terminal devices 210 are within a serving range of the network device 220 and the terminal devices 230 are out of the serving range of the network device 220. Only as an example, as shown in FIG. 2, the terminal device 210-1 can also perform sidelink communications with the terminal device 230-1. Only for the purpose of illustrations, embodiments of the present disclosure are described mainly with the reference to the sidelink communications between the terminal device 210-1 and the terminal device 210-3.

Communication in the communication system 200 can be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, such communication can utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (IVIIMO), Orthogonal Frequency Divided Multiple Access (OFDMA) and/or any other technologies currently known or to be developed in the future.

Example Processes

Figure 3:
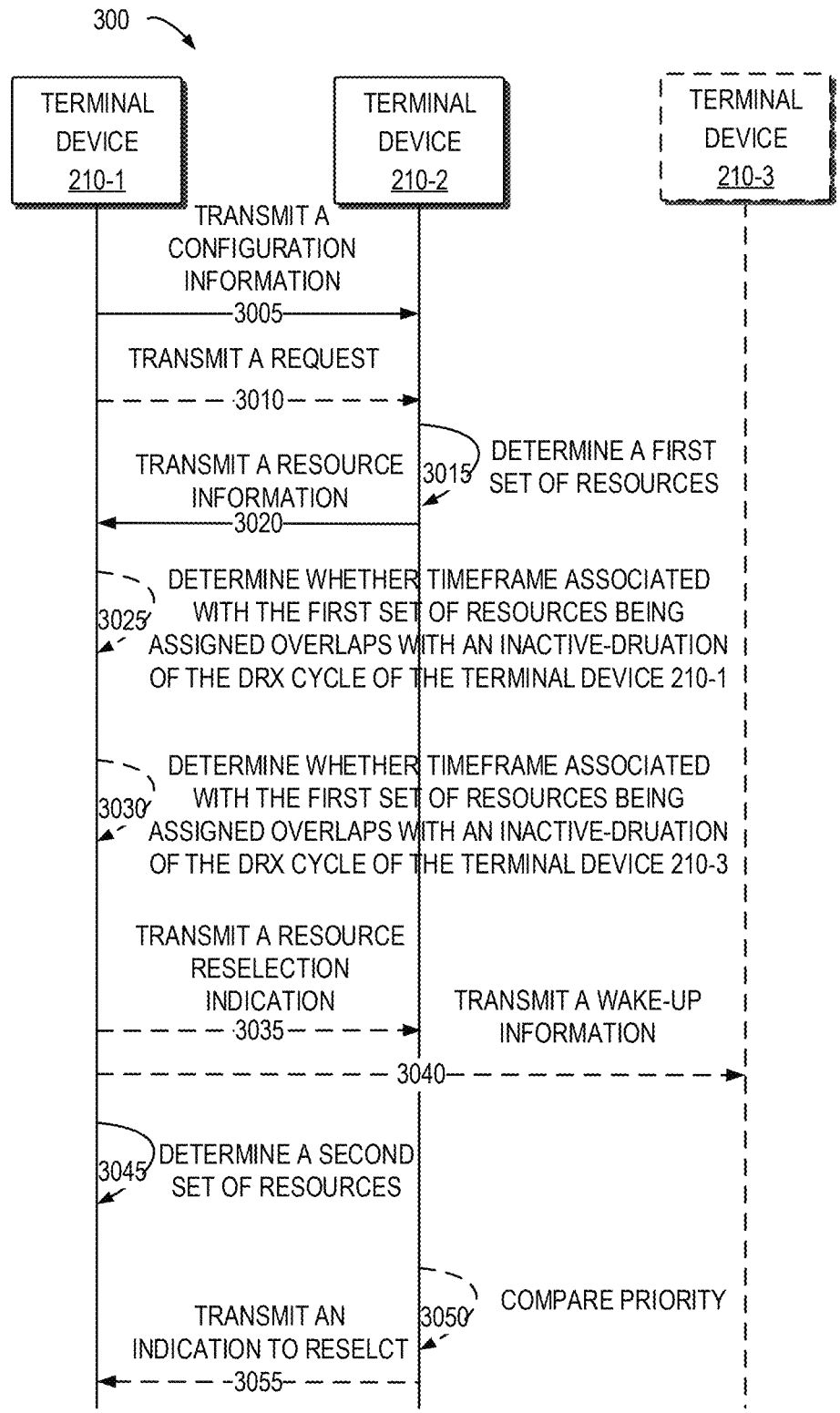
FIG. 3 illustrates a signaling chart illustrating an example process in accordance with an exemplary embodiment.

Some example processes in accordance with embodiments of the present disclosure will be described in detail below. Reference is now made to FIG. 3. FIG. 3 illustrates a signaling chart demonstrating an example process 300 according to some embodiments of the present disclosure. For the purpose of this discussion, the process 300 will also be described with reference to FIG. 2. Only as an example, the terminal device 210-2 can be regarded as an assisting UE which can allocate resources for sidelink communications. It should be noted that other suitable terminal devices can be regarded as the assisting UE as well. In some embodiments, the terminal device 210-2 can allocate resources for the sidelink communication with the terminal device 210-1. Alternatively, the terminal device 210-2 can allocate resources for the sidelink communication between the terminal device 210-1 and other terminal devices, for example, the terminal device 210-3. Only for the purpose of illustrations, the process 300 can involve the terminal devices 210-1, 210-2 and 210-3 as illustrated in FIG. 2.

The terminal device 210-1 (also referred to as "the first terminal device") transmits 3005 a configuration information to the terminal device 210-2 (also referred to as "the second terminal device"). In some example embodiments, the terminal device 210-1 can transmit 3010 a request (for example, an assistance request) for allocating resources to the terminal device 210-2. The configuration information can also be transmitted as part of such request. In other words, the transmission (3005) of the configuration information and the transmission (3010) of the request can be implemented in the same step. In other embodiments, if there is no such request for allocating resources to the terminal device 210-2, the configuration information can be transmitted via a new signaling. For example, the configuration information can be transmitted via a RRC signaling. Alternatively, a MAC control element (CE) signaling can be used for transmitting the configuration information. In other example embodiments, the terminal device 210-1 can transmit the configuration information via a PHY (e.g. sidelink control information) signaling. It should be noted that the configuration information can be transmitted via any suitable signaling.

In some embodiments, if the configuration information has been updated, the terminal device 210-1 needs to transmit the updated configuration information to the terminal device 210-2. For example, if the configuration information is transmitted in the request for allocating resources, the updated configuration information can be transmitted as a part of such request as well. Alternatively, if there is no such request, the updated configuration information can be transmitted via a new signaling. In this way, the terminal device 210-2 can allocate resources for sidelink communication more proper.

In an example embodiment, the configuration information can comprise a DRX configuration (also referred to as the first DRX configuration) for the terminal device 210-1. Alternatively or in addition, the configuration information can comprise a DRX configuration (also referred to as the second DRX configuration) for the terminal device 210-3. In some embodiments, the first DRX configuration can be determined by a network device (for example, the network device 220). In other embodiments, the first DRX configuration can be determined by a sidelink peer UE. For example, if another terminal device (for example, the terminal device 210-5) transmits sidelink data to terminal device 210-1 for a specific traffic between the terminal device 210-5 and terminal device 210-1, the terminal device 210-5 can determine the first configuration for the terminal device 210-1.

In some example embodiments, for example, in network coverage case, the terminal device 210-1 can obtain the first DRX configuration from the network device 220. In some embodiments, the first DRX configuration can be obtained from a dedicated Radio Resource Control (RRC) signaling. Alternatively, the first DRX configuration can be obtained from a system information block received by the terminal device 210-1. In other example embodiments of the network coverage case, the terminal device 210-1 can obtain the first DRX configuration from a sidelink peer UE. The network coverage case can refer to a case when the terminal device 210-1 is within a serving range of the network device 220. In other words, the terminal device 210-1 can receive signals or information from the network device 220. Even though not shown in FIG. 2, in some embodiments, the terminal device 210-1 can be out of serving range of the network device 220, which can be called an out-of-network coverage case. In the out-of-network coverage case, the terminal device 210-1 can obtain the first DRX configuration from the sidelink peer UE. The out-of-network coverage case can refer to a case where the terminal device 210-1 cannot receive signaling or information (for example, reference information or system information of the network device 220) from the network device 220. The out-of-network coverage case can refer to another case where a reference signal received power (RSRP) on a channel between the terminal device 210-1 and the network device 220 is within a power threshold. In other embodiments, in out of network coverage case, the terminal device 210-1 can obtain the first DRX configuration from a pre-configured configuration. In some embodiments, the first DRX configuration can be pre-configured at the terminal device 210-1. For example, the pre-configured configuration can be configured to the terminal device 210-1 when the terminal device 210-1 was produced. Alternatively, the pre-configured configuration can be received from the network device 220 when the terminal device 210-1 is in the serving range of the network device 220 and the pre-configured configuration can still be used when the terminal device 210-1 is out of the serving range of the network device 220. For example, the first DRX configuration can be obtained from a system information block. The system information block can be received from the network device 220 when the terminal device 210-1 is in the serving range of the network device 220. In other example embodiments, the second DRX configuration can be sent to the terminal device 210-1 by the terminal device 210-3.

In other example embodiments, the configuration information can also comprise an indication on whether the terminal device 210-2 should consider the DRX configuration when allocating resources for the sidelink communications. For example, the configuration information can comprise an indication regarding whether a first set of resources needs to be determined based on the first DRX configuration. Alternatively or in addition, the configuration information can comprise an indication regarding whether the first set of resources needs to be determined based on the second DRX configuration. In order to secure the reception of the configuration information, the transmission of the configuration information can follow DRX cycle implemented by the terminal devices. For example, the configuration information can be transmitted in an on-duration(s) of the DRX cycle implemented at the terminal device 210-2.

In some example embodiments, the first DRX configuration can also comprise an identity of the terminal device 210-1. The identity can be any suitable identities that can be used to identify the terminal device 210-1.

In an example embodiment, the first DRX configuration can comprise DRX related parameters for the terminal device 210-1. In some embodiments, the first DRX configuration can comprise a start time of an on-duration implemented by the terminal device 210-1. Alternatively or in addition, a length of the on-duration of the terminal device 210-1 can also be included in the first DRX configuration. In other example embodiments, the first DRX configuration can comprise of a DRX cycle for the terminal device 210-1.

Figure 4A:
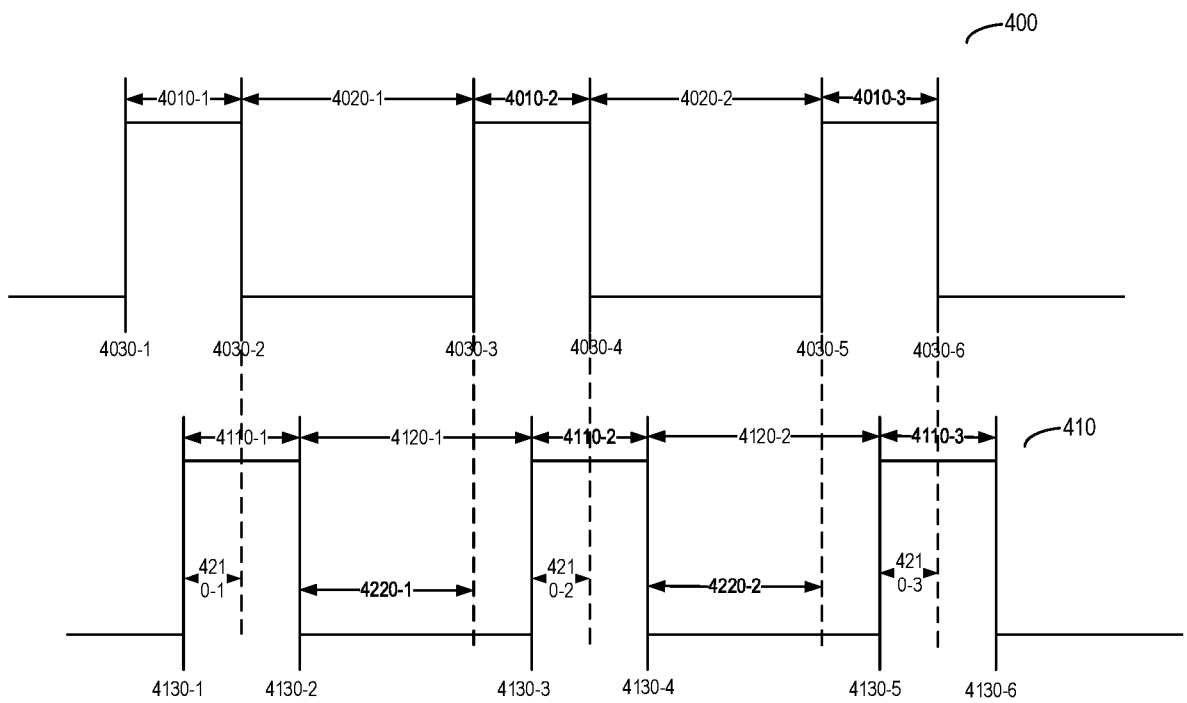
FIGS. 4A and 4B illustrate schematic diagrams of DRX configurations in accordance with an exemplary embodiment.

By way of example, FIG. 4A illustrates a schematic diagram of the first DRX configuration 400 according to some embodiments. As shown in FIG. 4A, the durations 4010-1, 4010-2 and 4010-3 can refer to on-durations of the DRX configuration at the terminal device 210-1 and the durations 4020-1 and 4020-2 can refer to off-durations of the DRX configuration at the terminal device 210-1. The duration 4010-1 and the duration 4020-1 can be regarded as being part of one DRX cycle. In some embodiments, the active-duration can comprise one or more on-durations and one or more time durations of one or more active timers which can control reception of the terminal device. For example, the active duration can comprise one or more of durations 4010-1, 4010-2 and 4010-3 and other time durations (not shown) of the one or more active timers. The other duration can overlap with the off-durations. In some embodiments, the inactive-duration can comprise one or more off-durations and one or more time durations of one or more active timers which can control the terminal device 210-1 not to receive. For example, the inactive duration can comprise one or more of durations 4020-1 and 4020-2 and other time durations (not shown) of the one or more active timers. The other duration can overlap with the on-durations. For example, the first DRX configuration 400 can comprise a start time 4030-1 of the duration 4010-1. The first DRX configuration 400 can also comprise the length of the duration 4010-1. In addition, the first DRX configuration 400 can comprise the DRX cycle which includes the duration 4010-1 and the duration 4020-1.

Alternatively, the first DRX configuration can comprise an accurate time period for resource assistance. The term "accurate time period for resource assistance" used herein can refer to a time period that the terminal device 210-1 is within active-duration during this time period, and the terminal device 210-2 can provide a preferred resource(s) of which time domain is within this time period. For example, as shown in FIG. 4A, the accurate time period in the first DRX configuration can refer to one or more of: the duration 4010-1, the duration 4010-2 or the duration 4010-3. In some example embodiments, the first DRX configuration can comprise both a start time and an end time associated with an active-duration of a DRX cycle supported by the terminal device 210-1. In some embodiments, the active-duration can comprise one or more on-durations and one or more time durations of one or more active timers which can control reception of the terminal device. For example, the active duration can comprise one or more of durations 4010-1, 4010-2 and 4010-3 and other time durations (not shown) of the one or more active timers. The other duration can overlap with the off-durations. For example, as shown in FIG. 4A, the first DRX configuration 400 can comprise the start time 4030-1 of the duration 4010-1 and the end time 4030-2 of the duration 4010-1. The first DRX configuration 400 can also comprise the start time 4030-3 of the duration 4010-2 and the end time 4030-4 of the duration 4010-2. Additionally, the first DRX configuration 400 can comprise the start time 4030-5 of the duration 4010-3 and the end time 4030-6 of the duration 4010-3.

In other example embodiments, the first DRX configuration can comprise both a start time and an end time associated with an inactive-duration of a DRX cycle implemented by the terminal device 210-1. In some embodiments, the inactive-duration can comprise one or more off-durations and one or more time durations of one or more active timers which can control the terminal device 210-1 not to receive. For example, the inactive duration can comprise one or more of durations 4020-1 and 4020-2 and other time durations (not shown) of the one or more active timers. The other duration can overlap with the on-durations. Referring to FIG. 4A, the first DRX configuration 400 can comprise the start time 4030-2 of the duration 4020-1 and the end time 4030-3 of the duration 4020-1. The first DRX configuration 400 can also comprise the start time 4030-4 of the duration 4020-2 and the end time 4030-5 of the duration 4020-2.

Alternatively, the first DRX configuration can comprise the start time of an active-duration of a DRX cycle implanted by of the terminal device 210-1 and a length of the active-duration. For example, the first DRX configuration 400 can comprise the start time 4030-1 of the duration 4010-1 and the length of the duration 4010-1. The first DRX configuration 400 can also comprise the start time 4030-3 of the duration 4010-2 and the length of the duration 4010-2. Additionally, the first DRX configuration 400 can comprise the start time 4030-5 of the duration 4010-3 and the length of the duration 4010-3.

As another example embodiment, the first DRX configuration can comprise a start time of an inactive-duration of a DRX cycle implemented by the terminal device 210-1 and a length of the inactive-duration. For example, the first DRX configuration 400 can comprise the start time 4030-2 of the duration 4020-1 and the length of the duration 4020-1. The first DRX configuration 400 can also comprise the start time 4030-4 of the duration 4020-2 and the length of the duration 4020-2.

In some example embodiments, the second DRX configuration can comprise an identity of the terminal device 210-3. The identity can be any suitable identities that are able to identify the terminal device 210-3. In some embodiments, the second DRX configuration can be determined by the network device (for example, the network device 220). In other embodiments, the second DRX configuration can be determined by a sidelink peer UE. For example, if the terminal device 210-1 can be regarded as a TX UE, the terminal device 210-1 can determine the second configuration for the terminal device 210-3 which can be regarded as a RX UE. In some example embodiments, for example, in network coverage case, the terminal device 210-3 can obtain the second DRX configuration from the network device 220. In other example embodiments, the network coverage case, the terminal device 210-3 can obtain the second DRX configuration from a sidelink peer UE (for example, the terminal device 210-1). Alternatively, in out of network coverage case, the terminal device 210-3 can obtain the second DRX configuration from the sidelink peer UE. In other embodiments, in out of network coverage case, the terminal device 210-3 can obtain the second DRX configuration from a pre-configured configuration. In some embodiments, the pre-configured configuration can be received from the network device 220 when the terminal device 210-3 is in the serving range of the network device 220 and the pre-configured configuration can still be used when the terminal device 210-3 is out of the serving range of the network device 220. For example, the second DRX configuration can be obtained from a system information block. The system information block can be received from the network device 220 when the terminal device 210-3 is in the serving range of the network device 220. Alternatively, the second DRX configuration can be preconfigured at the terminal device 210-3. For example, the pre-configured configuration can be configured to the terminal device 210-3 when the terminal device 210-3 was produced.

In an example embodiment, the second DRX configuration can comprise DRX related parameters for the terminal device 210-3. In some embodiments, the second DRX configuration can comprise a start time of an on-duration of a DRX cycle supported by the terminal device 210-3. Alternatively or in addition, a length of the on-duration of the DRX cycle supported by the terminal device 210-3 can be included in the second DRX configuration. In other example embodiments, the second DRX configuration can comprise a DRX cycle for the terminal device 210-3.

By way of example, FIG. 4A also illustrates a schematic diagram of the second DRX configuration 410 according to some embodiments. As shown in FIG. 4A, the durations 4110-1, 4110-2 and 4110-3 can refer to on-durations of the DRX configuration at the terminal device 210-3 and the durations 4120-1 and 4120-2 can refer to off-durations of the DRX configuration at the terminal device 210-3. The duration 4110-1 and the duration 4120-1 can be regarded as being part of one DRX cycle. In some embodiments, the active-duration can comprise one or more on-durations and one or more-time durations of one or more active timers which can control reception of the terminal device. For example, the active duration can comprise one or more of durations 4110-1, 4110-2 and 4110-3 and other time durations (not shown) of the one or more active timers. The other duration can overlap with the off-durations. In some embodiments, the inactive-duration can comprise one or more off-durations and one or more-time durations of one or more active timers which can control the terminal device 210-1 not to receive. For example, the inactive duration can comprise one or more of durations 4120-1 and 4120-2 and other time durations (not shown) of the one or more active timers. The other duration can overlap with the on-durations. For example, the second DRX configuration 410 can comprise a start time 4130-1 of the duration 4110-1. The second DRX configuration 410 can also comprise the length of the duration 4110-1. In addition, the second DRX configuration 410 can comprise the DRX cycle which includes the duration 4110-1 and the duration 4120-1.

Alternatively, the second DRX configuration can comprise an accurate time period for resource assistance. The term "accurate time period for resource assistance" used herein can refer to a time period that the terminal device 210-3 is within active-duration during this time period, and the terminal device 210-2 can provide a preferred resource(s) of which time domain is within this time period. For example, as shown in FIG. 4A, the accurate time period in the second DRX configuration can refer to one or more of: the duration 4110-1, the duration 4110-2 or the duration 4110-3. In some example embodiments, the second DRX configuration can comprise both a start time and the end time of an active-duration associated with a DRX cycle implanted by the terminal device 210-3. In some embodiments, the active-duration can comprise one or more on-durations and one or more-time durations of one or more active timers which can control reception of the terminal device. For example, the active duration can comprise one or more of durations 4110-1, 4110-2 and 4110-3 and other time durations (not shown) of the one or more active timers. The other duration can overlap with the off-durations. For example, as shown in FIG. 4A, the second DRX configuration 410 can comprise the start time 4130-1 of the duration 4110-1 and the end time 4130-2 of the duration 4110-1. The second DRX configuration 410 can also comprise the start time 4130-3 of the duration 4110-2 and the end time 4130-4 of the duration 4110-2. Additionally, the second DRX configuration 410 can comprise the start time 4130-5 of the duration 4110-3 and the end time 4130-6 of the duration 4110-3.

In other example embodiments, the second DRX configuration can comprise both a start and an end time of an inactive-duration associated with DRX cycle implanted by the terminal device 210-3. In some embodiments, the inactive-duration can comprise one or more off-durations and one or more-time durations of one or more active timers which can control the terminal device 210-1 not to receive. For example, the inactive duration can comprise one or more of durations 4120-1 and 4120-2 and other time durations (not shown) of the one or more active timers. The other duration can overlap with the on-durations. Referring to FIG. 4A, if the second DRX configuration 410 can comprise the start time 4130-2 of the duration 4120-1 and the end time 4130-3 of the duration 4120-1. The second DRX configuration 410 can also comprise the start time 4130-4 of the duration 4120-2 and the end time 4130-5 of the duration 4120-2.

Alternatively, the second DRX configuration can comprise a start time of an active-duration of a DRX cycle implemented the terminal device 210-3 and a length of the active-duration. For example, the second DRX configuration 410 can comprise the start time 4130-1 of the duration 4110-1 and the length of the duration 4110-1. The second DRX configuration 410 can also comprise the start time 4130-3 of the duration 4110-2 and the length of the duration 4110-2. Additionally, the second DRX configuration 410 can comprise the start time 4130-5 of the duration 4110-3 and the length of the duration 4110-3.

As another example embodiment, the second DRX configuration can comprise the start time of the inactive-duration of the terminal device 210-3 and length of the inactive-duration. For example, if the inactive-duration comprises the duration 4120-1 and another time duration associated with a timer, the second DRX configuration 410 can comprise the start time 4130-2 of the duration 4120-1 and the length of the duration 4120-1 and a start time of the other time duration and a length of the other time duration. If the inactive-duration comprises more than one off-duration, the second DRX configuration 410 can comprise of the start time 4130-2 of the duration 4120-1 and the length of the duration 4120-1, the start time 4130-4 of the duration 4120-2 and the length of the duration 4120-2 and a start time of the other time duration (not shown) and a length of the other time duration.

In other example embodiments, the configuration information can comprise an accurate time period for resource assistance for the sidelink UE pair (for example, the terminal devices 210-1 and 210-3). The term "accurate time period for resource assistance" used herein can refer to a time period that both the terminal device 210-1 and the terminal device 210-3 are within active-duration during this time period, and the terminal device 210-2 can provide a preferred resource(s) of which time domain is within this time period. For example, as shown in FIG. 4A, the accurate time period for the sidelink UE pair can refer to one or more of the duration 4210-1, the duration 4210-2 or the duration 4210-3. In some embodiments, the accurate time period for resource assistance can be determined by the terminal device 210-1 based on the first configuration and the second configuration. In this case, the configuration information can explicitly indicate the accurate time period for resource assistance. In other embodiments, the accurate time period for resource assistance for the sidelink UE pair can be determined by the terminal device 210-2 based on the first configuration and the second configuration included in the configuration information.

In some embodiments, the configuration information can comprise a start time of a common active-duration for the terminal devices 210-1 and 210-3, and an end time of the common active-duration for the terminal devices 210-1 and 210-3. As shown in FIG. 4A, the configuration information can comprise the start time 4130-1 of the active-duration 4210-1 and the end time 4030-2 of the active-duration 4210-1. The configuration information can also comprise the start time 4130-3 of the active-duration 4210-2 and the end time 4030-4 of the active-duration 4210-2. Additionally, the configuration can comprise the start time 4130-5 of the active-duration 4210-3 and the end time 4030-6 of the active-duration 4210-3.

Additionally, the configuration information can comprise a start time of a common inactive-duration for the terminal devices 210-1 and 210-3 and an end time of the common inactive-duration for the terminal devices 210-1 and 210-3. As shown in FIG. 4A, the configuration information can comprise the start time 4130-2 of the inactive-duration 4220-1 and the end time 4030-3 of the inactive-duration 4220-1. Additionally, the configuration can comprise the start time 4130-4 of the inactive-duration 4220-2 and the end time 4030-5 of the inactive-duration 4220-2.

Alternatively, the configuration information can comprise a start time of the common active-duration for the terminal devices 210-1 and 210-3 and a length of the common active-duration for the terminal devices 210-1 and 210-3. For example, as shown in FIG. 4A, the configuration information can comprise the start time 4130-1 of the active-duration 4210-1 and the length of the active-duration 4210-1. In addition, the configuration information can comprise the start time 4130-3 of the common active-duration 4210-2 and the length of the common active-duration 4210-2. The configuration information can also comprise the start time 4130-5 of the common active-duration 4210-3 and the length of the common active-duration 4210-3.

Additionally, the configuration information can comprise a start time of the common inactive-duration for the terminal devices 210-1 and 210-3 and a length of the common inactive-duration for the terminal devices 210-1 and 210-3. Only as an example, the configuration information can comprise the start time 4130-2 of the common inactive-duration 4220-1 and the length of the common inactive-duration 4220-1. In addition, the configuration information can comprise the start time 4130-4 of the common inactive-duration 4220-2 and the length of the common inactive-duration 4220-2.

Referring to diagram 300 in FIG. 3, the terminal device 210-2 determines 3015 the first set of resources for the sidelink communication based on the stored configuration information. In some embodiments, the first set of resources can contain preferred resources for the sidelink communication. Alternatively, the first set of resources can contain avoided resources for the sidelink communication. The avoided resources can refer to the resources that the terminal device 210-1 will avoid selecting when determining the sidelink transmission resources. In an example embodiment, the first set of resources can be shared resources or resource pool for multiple terminal devices, for example, the terminal devices 210-1 and 210-4. Alternatively, the first set of resources can be a dedicated resource or dedicated resource pool for the terminal device 210-1. In this way, resource collision can be mitigated.

In some example embodiments, if the configuration information transmitted to terminal device 210-2 comprises an indication which indicates that the first set of resources do not need to be determined based on the first DRX configuration or the second DRX configuration, the terminal device 210-2 can determine the set of resources without considering the configuration information received. For example, the first set of resources can be determined based on results of sensing procedure of the terminal device 210-2. The term "sensing" used herein can refer to a process where a UE monitors a set of resources to identify if the set of resources is used by other UEs based on the received SCI information from other UEs which transmitted on PSCCH. The term "results of sensing procedure" used herein can refer to a result indicating whether the sensed set of resources is available or unavailable for the device which performs the sensing. If the results of sensing procedure on a set of resources indicate that the set of resource are not used or reserved by other devices, the set of resources can be selected as the first set of resources by terminal device 210-2. If the results of sensing procedure on the set of resources indicate that the set of resources are used or reserved by other devices, the set of resources cannot be selected as the first set of resources by terminal device 210-2.

Alternatively, the indication can indicate that the first set of resources needs to be determined based on the first DRX configuration. The terminal device 210-2 can determine the first set of resources that are within the active-duration of the DRX cycle of the terminal device 210-1. For example, if the first set of resources represents a set of preferred resources to be used for sidelink communication, the first set of resources can be assigned during the active-durations, for example 4010-1 or 4010-2 or 4010-3, of the DRX cycle. If the first set of resources is a set of avoided resources for the sidelink communication, timeframe associated with the first set of resources can overlap with the durations 4020-1 and 4020-2.

In some example embodiments, the indication can indicate that the first set of resources needs to be determined based on the second DRX configuration. The terminal device 210-2 can determine the first set of resources that is within the active-duration of the DRX cycle of the terminal device 210-3. For example, if the first set of resources contains a set of preferred resources for sidelink communication, the first set of resources can be assigned during the active-durations, for example 4110-1 or 4110-2 or 4110-3, of the second DRX cycle. If, on the other hand, the first set of resources contains a set of avoided resources for the sidelink communication, timeframe associated with the first set of resources can overlap with the durations 4120-1 and 4120-2. The avoided resources can refer to the resources that the terminal device 210-1 will avoid selecting when determining the sidelink transmission resources.

In other embodiments, the indication can indicate that the first set of resources needs to be determined based on the first DRX configuration and the second DRX configuration. The terminal device 210-2 can determine the first set of resources that is within the overlapping active-durations period of the DRX cycle of the terminal device 210-1 and the DRX cycle of the terminal device 210-3. For example, if the first set of resources represents a set of preferred resources to be used for sidelink communication, the first set of resources can be assigned during the active-durations, for example, the durations 4210-1, 4210-2 or 4210-3. If the first set of resources is a set of avoided resources for the sidelink communication, timeframe associated with the first set of resources can overlap with the durations 4220-1 and 4220-2. The avoided resources can refer to the resources that the terminal device 210-1 will avoid when determining the sidelink transmission resources.

Referring back to FIG. 3, the terminal device 210-2 transmits 3020 a resource information to the terminal device 210-1. The resource information indicates the first set of resources. In some example embodiments, the resource information can be transmitted via a RRC signaling. Alternatively, a MAC CE signaling can be used for transmitting the resource information. In other example embodiments, the terminal device 210-2 can transmit the resource information via a PHY (e.g. sidelink control information) signaling. It should be noted that the first set of resources can be transmitted via any suitable signaling.

The terminal device 210-1 determines 3045 a second set of resources based on the first set of resources and the configuration information. In some example embodiments, the terminal device 210-1 can also determine 3025 whether timeframe associated with the first set of resources being assigned overlaps with an inactive-duration of the DRX cycle of the terminal device 210-1 in time domain based on the configuration information. For example, in some embodiments, the first configuration in the configuration information can indicate the inactive-duration of the DRX cycle for the terminal device 210-1. The terminal device 210-1 can determine whether the timeframe associated with the first set of resources overlaps with the inactive-duration indicated in the first configuration information. If the timeframe associated with the first set of resources does not overlap with the inactive-duration of the DRX cycle for the terminal device 210-1, the terminal device 210-1 can determine 3045 the second set of resources from the first set of resources. For example, if timeframe associated with the first set of resources does not overlap with the inactive-durations 4020-1 and 4020-2, the second set of resources can be selected from the first set of resources. By way of example, the terminal device 210-1 can perform sensing on the first set of resources to detect whether one or more resources in the first set of resources is/are available for the terminal device 210-1 to use. If the terminal device 210-1 determines that the one or more resources is/are not used or reserved by other terminal devices based on the results of sensing procedure, such resource(s) can be regarded as an available resource(s). Then, the terminal device 210-1 can select one or more available resources in the first set of resources to be part of the second set of resources, which means the second set of resources is a subset of the first set of resources.

Figure 4B:
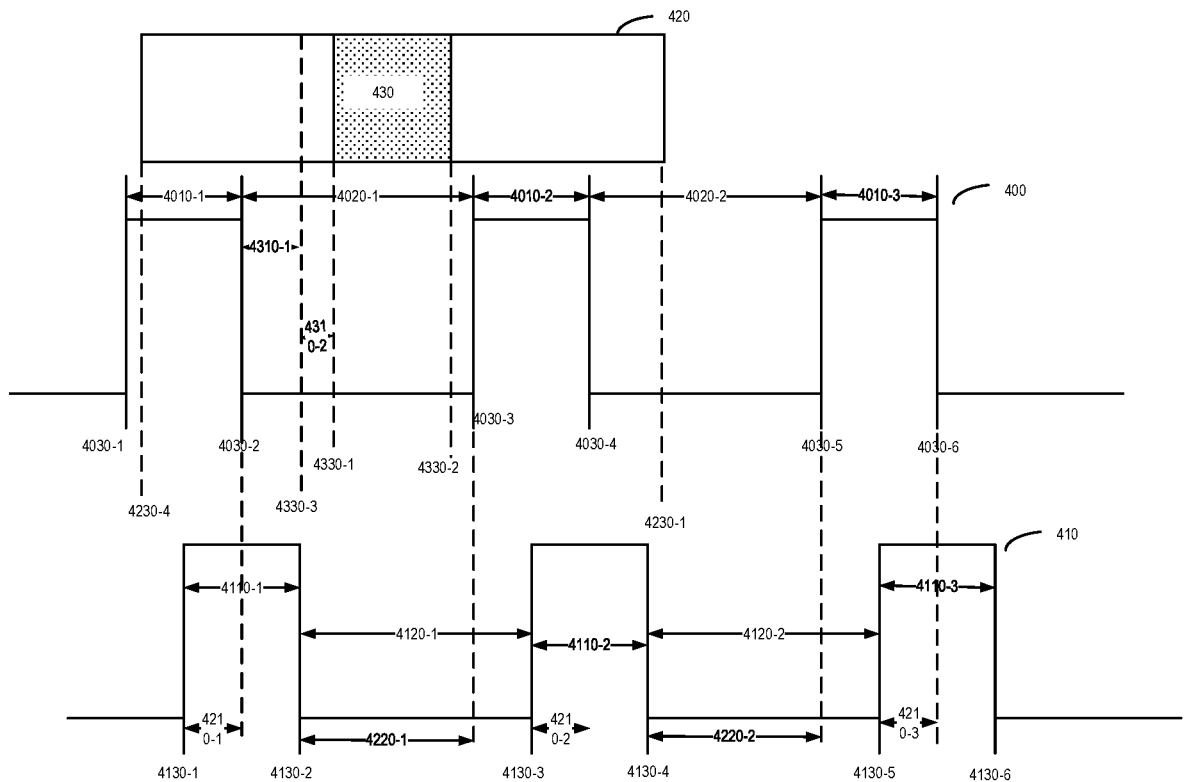

In some embodiments, the terminal device 210-1 does not need to consider the first DRX configuration of the terminal device 210-1 when the terminal device 210-1 determines the second set of resources. In this situation, the step 3025 can be omitted. Thus, the step 3025 is optional. The terminal device 210-1 can perform sensing on the first set of resources in the active-duration. In this case, the terminal device 210-1 determines 3045 the second set of resources based on the results of sensing procedure of the first set of resources. For example, as shown FIG. 4B, the terminal device 210-1 can perform sensing on the first set of resources 420 and select the second set of resources 430 from the first set of resources 420 based on the results of sensing procedure. Moreover, before the second set of resource is actually used for sidelink communication between the terminal device 210-1 and the terminal device 210-3, the terminal device 210-1 can perform re-evaluation on this second set of resources to check if the second set of resources is still available. Such re-evaluation can refer to a process where UE reconfirms whether the second set of resources can still be used by performing the process of sensing. Generally, re-evaluation should be performed prior to the start of any transmission using the second set of resources. In some embodiments, the active-duration can extend from the point in time a current on-duration of the DRX cycle implemented by the terminal device 210-1 ends to a re-evaluation cut-off time for the second set of resources. For example, as shown in FIG. 4B, the start time of a transmission on the second set of resources is at time 4330-1, the re-evaluation cut-off time is at time 4330-3, and the offset value between the start time 4330-1 and the re-evaluation cut-off time 4330-3 is represented as time duration 4310-2. In this situation, the active-duration has been extended from the time 4030-2 which represents the end time of the current on-duration of the DRX cycle implemented by the terminal device 210-1 to the time 4330-3 which is the re-evaluation cut-off time for the second set of resources and refers to a point in time by which re-evaluation of all previously identified resource belonging to the second resource set should be completed. Only for the purpose of illustrations, if the second resource set consists of two resources, the terminal device can perform re-evaluation of such resources prior to initiating transmission on these resources in order to determine whether they are still available. The re-evaluation of these resources should complete no later than the re-evaluation cut-off time. In some embodiments, the re-evaluation cut-off time can be represented as m-T3, where "m" represents the time when transmission starts on the specific resource(s) and T3 is an offset value between the time transmission starts and the re-evaluation cut-off time.

Alternatively, the active-duration can represent a period corresponding to time starting at a point in time when the first set of resources becomes available to the point in time the first set of resources is no longer available. Only as an example, as shown in FIG. 4B, the active-duration can begin at the time 4230-4, which is the time the first set of resources becomes available, to the point in time 4230-1, which represents the time when the first set of resources is no longer available for the terminal device.

In other example embodiments, if the first set of resources partially overlaps with the inactive-duration (for example, the duration 4020-1 or 4020-2) of the terminal device 210-1, the terminal device 210-1 can determine a subset of resources from the first set of resources that overlaps in time domain only with an active-duration of the terminal device 210-1. For example, the subset of resources can overlap with one or more of the durations 4010-1, 4010-2 and 4010-3. Referring to FIG. 3, the terminal device 210-1 can determine the subset of resources that overlaps in time domain with an active-duration of the terminal device 210-1 from the first set of resources. In this situation, the terminal device 210-1 can determine 3045 the second set of resources from the subset of resources that overlaps in time domain with an active-duration of the terminal device 210-1. For example, the terminal device 210-1 can determine the second set of resources based on sidelink traffic information between the terminal device 210-1 and the terminal device 210-3. The sidelink traffic information can comprise characteristic parameters related to the sidelink traffic between the terminal device 210-1 and the terminal device 210-3. For example, the sidelink traffic information can comprise a maximum transport block size of the sidelink traffic.

In some example embodiments, if the first set of resources overlaps with the inactive-duration (for example, the duration 4020-1 or 4020-2) of the terminal device 210-1, the terminal device 210-1 cannot perform sensing on the first set of resources and then the terminal device 210-1 can determine not to transmit data using resources from the first set of resources. In such situation, the terminal device 210-1 can generate a resource reselection indication to the terminal device 210-2, wherein such indication is used to inform the terminal device 210-2 that the first set of resources is not available and another set of resources is requested by the terminal device 210-1. Then, the terminal device 210-1 can transmit 3035 the resource reselection indication to the terminal device 210-2. In these embodiments, after the terminal device 210-2 receives the resource reselection indication from the terminal device 210-1, the terminal device 210-2 can allocate a third set of resources for the sidelink communication and transmit information indicating the third set of resources to the terminal device 210-1. The terminal device 210-1 can determine 3045 the second set of resources based on the third set of resources. In this situation, the second set of resources can be determined from the third set of resources in a similar approach as determining the second set of resources from the first set of resources. Alternatively, if the first set of resources overlaps with the inactive-duration (for example, the duration 4020-1 or 4020-2) of the terminal device 210-1, the terminal device 210-1 can randomly select the second set of resources from the first set of resources. In this case, the terminal device 201-1 can select the second set of resources randomly from the first set of resources without perform sensing procedure.

In some example embodiments, the terminal device 210-1 can determine 3030 whether timeframe associated with the first set of resources being assigned overlaps with an inactive-duration of the DRX cycle of the terminal device 210-3 in time domain based on the configuration information. For example, in some embodiments, the second configuration in the configuration information can indicate the inactive-duration of the DRX cycle for the terminal device 210-3, the terminal device 210-1 can determine whether the timeframe associated with the first set of resources overlaps with the inactive-duration indicated in the second configuration information since terminal device 210-1 has acquired the second configuration of the terminal device 210-3 when sidelink radio link is established between terminal device 201-1 and terminal device 210-3. If the timeframe associated with the first set of resources does not overlap with the inactive-duration of the DRX cycle for the terminal device 210-3, the terminal device 210-1 can determine 3045 the second set of resources from the first set of resources. For example, if timeframe associated with the first set of resources does not overlap with the inactive-durations 4120-1 and 4120-2, the second set of resources can be selected from the first set of resources. By way of example, the terminal device 210-1 can perform sensing on the first set of resources to detect whether one or more resources in the first set of resources is/are available for the terminal device 210-1 based on the received SCI information which transmitted on PSCCH from other UEs. If the terminal device 210-1 determines that a resource is not used or reserved by other terminal devices based on the results of sensing procedure, the resource can be regarded as an available resource. Then, the terminal device 210-1 can select one or more available resources in the first set of resources to be the second set of resources, which means the second set of resources is a subset of the first set of resources. In some embodiments, the terminal device 210-1 does not need to consider the second DRX configuration of the terminal device 210-3 when the terminal device 210-1 determines the second set of resources. In this situation, the step 3030 can be omitted. Thus, the step 3030 is optional.

In other example embodiments, if the first set of resources partially overlaps with the inactive-duration (for example, the duration 4120-1 or 4120-2) of the terminal device 210-3, the terminal device 210-1 can determine a subset of resources from the first set of resources which overlaps in time domain with an active-duration of the terminal device 210-3. For example, the subset of resources can overlap with one or more of the durations 4110-1, 4110-2 and 4110-3. In some embodiments, the subset of resources can overlap with active-durations for both the terminal devices 210-1 and 210-3. In this situation, the terminal device 210-1 can determine 3045 the second set of resources from the subset of resources that overlaps in time domain with an active-duration of the terminal device 210-1 and the terminal device 210-3. For example, the terminal device 210-1 can determine the second set of resources based on sidelink traffic information between the terminal device 210-1 and the terminal device 210-3. The sidelink traffic information can comprise characteristic parameters related to the sidelink traffic between the terminal device 210-1 and the terminal device 210-3. For example, the sidelink traffic information can comprise a maximum transport block size of the sidelink traffic.

In some example embodiments, if the first set of resources overlaps with the inactive-duration (for example, the duration 4120-1 or 4120-2) of the terminal device 210-3, the terminal device 210-3 cannot perform reception on the first set of resources and then the terminal device 210-1 can determine not to transmit data using resources from the first set of resources. In such situation, the terminal device 210-1 can generate a resource reselection indication and transmit the resource reselection indication to the terminal device 210-2. The term "resource reselection indication" used herein can refer to an indication which informs the terminal device 210-2 that the first set of resources is not available and another set of resources is requested by the terminal device 210-1. Then, the terminal device 210-1 can transmit 3035 the resource reselection indication to the terminal device 210-2. In these embodiments, after the terminal device 210-2 receives the resource reselection indication from the terminal device 210-1, the terminal device 210-2 can allocate a third set of resources for the sidelink communication and transmit information indicating the third set of resources to the terminal device 210-1. In these embodiments, after the terminal device 210-2 receives the resource reselection indication from the terminal device 210-1, the terminal device 210-1 can determine 3045 the second set of resources based on the third set of resources. In this situation, the second set of resources can be determined from the third set of resources in a similar approach as determining the second set of resources from the first set of resources. Alternatively, if the first set of resources overlaps with the inactive-duration (for example, the duration 4120-1 or 4120-2) of the terminal device 210-3, the terminal device 210-1 can randomly select the second set of resources from the first set of resources. In this case, the terminal device 201-1 can select the second set of resources randomly from the first set of resources without perform sensing procedure.

In other example embodiments, if the first set of resources overlaps with the inactive-duration (for example, the duration 4120-1 or 4120-2) of the terminal device 210-3, the terminal device 210-1 can transmit 3040 a wake-up information to the terminal device 210-3, wherein such information will request the terminal device 210-3 to perform reception during a time period that corresponds to the first set of resources. The wake-up information can indicate a time period during which the terminal device 210-3 needs to keep awake and perform sidelink reception. In other words, the terminal device 210-3 can perform mandatory reception during this time period. Only as an example, the time period indicated in the wake-up information can start at the beginning of a time period that overlaps in time the start of the first set of resources becoming available and lasts until the end of such period that corresponds in time with an end of the first set of resources being available. For example, as shown in FIG. 4B, the time period can start from the time 4230-4 which is the time representing a beginning of the first set of resources becomes available to the point in time 4230-1 which represents the end of the first set of resources being available. Alternatively, the timer can start from a beginning of a time period that overlaps in time with the second set of resources becoming available and lasts until an end of such period that corresponds to the second set of resources becoming unavailable. For example, as shown in FIG. 4B, the time period can start from the time point 4330-1 which represents the beginning of the second set of resources becoming available to the time 4330-2 which represents the end of the second set of resources being available.

Alternatively, the wake-up information can comprise a timer. For example, the timer included in the wake-up information can start at the beginning of a time period that overlaps in time the start of the first set of resources becoming available and lasts until the end of such period that corresponds in time with an end of the first set of resources being available. For example, as shown in FIG. 4B, the time period can start from time 4230-4 which represents the beginning of the first set of resources becoming available, to the time 4230-1 which represents the end of the first set of resources being available. Alternatively, the timer included in the wake-up information can start from a beginning of a time period that overlaps in time with the second set of resources becoming available and lasts until an end of such period that corresponds to the second set of resources becoming unavailable. For example, as shown in FIG. 4B, the time period can start from the time 4330-1 which represents a starting time of the second set of resources becoming available, to the point in time 4330-2, which represents the end of the second set of resources being available. In other embodiments, the wake-up information can indicate the first set of resources. In order to secure the reception of the wake-up information, the transmission of the wake-up information can follow DRX cycle implemented by the terminal devices. For example, the wake-up information can be transmitted in an on-duration(s) of the DRX cycle implemented at the terminal device 210-3.

In some embodiments, the first set of resources can be provided to the terminal device 210-1 based on traffic priority. For example, the terminal device 210-2 can compare 3050 a priority of another terminal device (for example, the terminal device 210-4) with a priority of the terminal device 210-1. Alternatively, the terminal device 210-2 can compare the priority of the terminal device 210-4 with a threshold priority. If the priority of the terminal device 210-4 is higher than the terminal device 210-1 or higher than the threshold priority, the terminal device 210-2 can generate an indication to the terminal device 210-1 to reselect a resource which is reserved in a particular time slot by the terminal device 210-1 if the terminal device 210-4 has indicated that such resource was reserved. The terminal device 210-2 can then transmit 3055 such indication to the terminal device 210-1. The pre-emption from the terminal device 210-4 to the terminal device 210-1 should be performed not later than a predetermined time before the particular slot which comprises the reserved resource. The predetermined time can be configured at the terminal device 210-1 when the terminal device was produced.

In some example embodiments, the terminal device 210-1 can generate an indication which can inform the terminal device 210-2 of the second set of resources that was determined by the terminal device 210-1. In this case, the terminal device 210-1 can transmit such indication to the terminal device 210-2. In some example embodiments, the indication regarding the selected second set of resources can be transmitted via a RRC signaling. Alternatively, a MAC CE signaling can be used for transmitting the indication regarding the selected second set of resources. In other example embodiments, the terminal device 210-1 can transmit the indication regarding the selected second set of resources via a PHY signaling (e.g. Sidelink control information). It should be noted that the indication regarding the selected second set of resources can be transmitted via any suitable signaling. In order to secure the reception of the indication regarding the selected second set of resources, the transmission of the indication regarding the selected second set of resources can follow DRX cycle implemented by the terminal devices. For example, the configuration information can be transmitted in an on-duration(s) of the DRX cycle implemented at the terminal device 210-2.

Example Method

Figure 5:
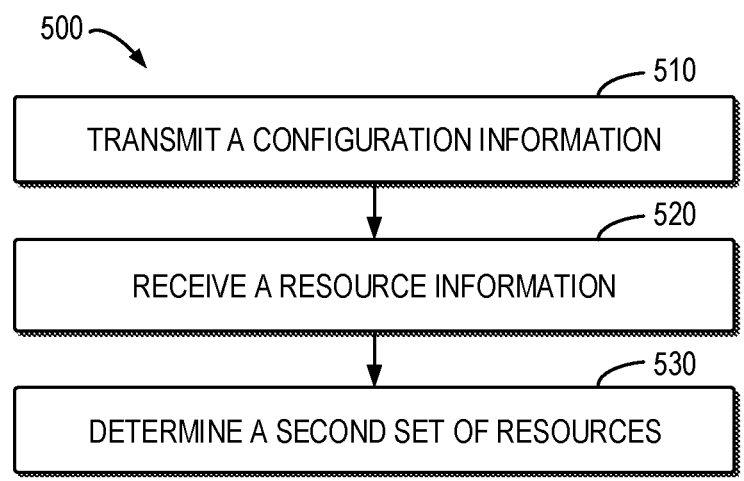
FIG. 5 illustrates a flowchart of an example method in accordance with an exemplary embodiment.

FIG. 5 illustrates a flowchart of an example method 500 according to some embodiments of the present disclosure. The method 500 can be performed by the terminal device 210-1 as shown in FIG. 2. It is to be understood that the method 500 can include additional blocks not shown and/or can omit some blocks as shown, and the scope of the present disclosure is not limited in this regard. For the purpose of discussion, the method 500 will be described from the perspective of the terminal device 210-1 with reference to FIG. 2.

At block 510, the terminal device 210-1 transmits a configuration information to the terminal device 210-2. In some example embodiments, the terminal device 210-1 can transmit a request (for example, an assistance request) for allocating resources to the terminal device 210-2. The configuration information can also be transmitted as part of such request. In other embodiments, if there is no such request for allocating resources to the terminal device 210-2, the configuration information can be transmitted via a new signaling. For example, the configuration information can be transmitted via a RRC signaling. Alternatively, a MAC control element (CE) signaling can be used for transmitting the configuration information. In other example embodiments, the terminal device 210-1 can transmit the configuration information via a PHY signaling (e.g. sidelink control information). It should be noted that the configuration information can be transmitted via any suitable signaling.

In some embodiments, if the configuration information has been updated, the terminal device 210-1 needs to transmit the updated configuration information to the terminal device 210-2. For example, if the configuration information is transmitted in the request for allocating resources, the updated configuration information can be transmitted as a part of such request as well. Alternatively, if there is no such request, the updated configuration information can be transmitted via a new signaling. In this way, the terminal device 210-2 can allocate resources for sidelink communication more proper.

In an example embodiment, the configuration information can comprise a first DRX configuration for the terminal device 210-1. Alternatively or in addition, the configuration information can comprise a second DRX configuration for the terminal device 210-3. In some embodiments, the first DRX configuration can be determined by a network device (for example, the network device 220). In other embodiments, the first DRX configuration can be determined by a sidelink peer UE. For example, if another terminal device (for example, the terminal device 210-5) transmits sidelink data to terminal device 210-1 for a specific traffic between the terminal device 201-5 and terminal device 210-1, the terminal device 210-5 can determine the first configuration for the terminal device 210-1.

In some example embodiments, for example, in network coverage case, the terminal device 210-1 can obtain the first DRX configuration from the network device 220. In some embodiments, the first DRX configuration can be obtained from a dedicated RRC signaling. Alternatively, the first DRX configuration can be obtained from a system information block received by the terminal device 210-1. In other example embodiments, the network coverage case, the terminal device 210-1 can obtain the first DRX configuration from a sidelink peer UE. Alternatively, in out of network coverage case, the terminal device 210-1 can obtain the first DRX configuration from the sidelink peer UE. In other embodiments, in out of network coverage case, the terminal device 210-1 can obtain the first DRX configuration from a pre-configured configuration. In some embodiments, the first DRX configuration can be preconfigured at the terminal device 210-1. For example, the pre-configured configuration can be configured to the terminal device 210-1 when the terminal device 210-1 was produced. Alternatively, the pre-configured configuration can be received from the network device 220 when the terminal device 210-1 is in the serving range of the network device 220 and the pre-configured configuration can still be used when the terminal device 210-1 is out of the serving range of the network device 220. For example, the first DRX configuration can be obtained from a system information block. The system information block can be received from the network device 220 when the terminal device 210-1 is in the serving range of the network device 220. In other example embodiments, the second DRX configuration can be sent to the terminal device 210-1 by the terminal device 210-3. Alternatively, the second DRX configuration can be sent to the terminal device 210-2 by the terminal device 210-3.

In other example embodiments, the configuration information can also comprise an indication on whether the terminal device 210-2 should consider DRX configuration when allocating resources for the sidelink communications. For example, the configuration information can comprise an indication regarding whether a first set of resources needs to be determined based on the first DRX configuration. Alternatively or in addition, the configuration information can comprise an indication regarding whether the first set of resources needs to be determined based on the second DRX configuration. In order to secure the reception of the configuration information, transmission of the configuration information can follow DRX cycle implemented by the terminal devices. For example, the configuration information can be transmitted in an on-duration(s) of the DRX cycle implemented at the terminal device 210-2.

In some example embodiments, the first DRX configuration can comprise an identity of the terminal device 210-1. The identity can be any suitable identities that are able to identify the terminal device 210-1.

In an example embodiment, the first DRX configuration can comprise DRX related parameters for the terminal device 210-1. In some embodiments, the first DRX configuration can comprise a start time of an on-duration implemented by the terminal device 210-1. Alternatively or in addition, a length of the on-duration of the terminal device 210-1 can also be included in the first DRX configuration. In other example embodiments, the first DRX configuration can comprise of a DRX cycle for the terminal device 210-1.

Alternatively, the first DRX configuration can comprise an accurate time period for resource assistance. The accurate time period for resource assistance can refer to a time period that the terminal device 210-1 is within active-duration during this time period, and the terminal device 210-2 can provide a preferred resource(s) of which time domain is within this time period. In some example embodiments, the first DRX configuration can comprise both a start time and an end time associated with an active-duration of a DRX cycle implemented by the terminal device 210-1.

In other example embodiments, the first DRX configuration can comprise both a start time and an end time associated with an inactive-duration of a DRX cycle implemented by the terminal device 210-1.

Alternatively, the first DRX configuration can comprise a start time of an active-duration of a DRX cycle implemented by the terminal device 210-1 and a length of the active-duration. As another example embodiment, the first DRX configuration can comprise the start time of an inactive-duration of the DRX cycle implemented by the terminal device 210-1 and length of the inactive-duration.

In some example embodiments, the second DRX configuration can comprise an identity of the terminal device 210-3. The identity can be any suitable identities that are able to identify the terminal device 210-3. In some embodiments, the second DRX configuration can be determined by the network device (for example, the network device 220). In other embodiments, the second DRX configuration can be determined by a sidelink peer UE. For example, if the terminal device 210-1 can be regarded as a TX UE, the terminal device 210-1 can determine the second configuration for the terminal device 210-3 which can be regarded as a RX UE. In some example embodiments, for example, in network coverage case, the terminal device 210-3 can obtain the second DRX configuration from the network device 220. In other example embodiments, the network coverage case, the terminal device 210-3 can obtain the second DRX configuration from a sidelink peer UE (for example, the terminal device 210-1). In some example embodiments, for example, in network coverage case, the terminal device 210-3 can obtain the second DRX configuration from the network device 220. In other example embodiments, the network coverage case, the terminal device 210-3 can obtain the second DRX configuration from a sidelink peer UE (for example, the terminal device 210-1). Alternatively, in out of network coverage case, the terminal device 210-3 can obtain the second DRX configuration from the sidelink peer UE. In other embodiments, in out of network coverage case, the terminal device 210-3 can obtain the second DRX configuration from a pre-configured configuration. In some embodiments, the pre-configured configuration can be received from the network device 220 when the terminal device 210-3 is in the serving range of the network device 220 and the pre-configured configuration can still be used when the terminal device 210-3 is out of the serving range of the network device 220. For example, the second DRX configuration can be obtained from a system information block. The system information block can be received from the network device 220 when the terminal device 210-3 is in the serving range of the network device 220. Alternatively, the second DRX configuration can be preconfigured at the terminal device 210-3. For example, the pre-configured configuration can be configured to the terminal device 210-3 when the terminal device 210-3 was produced.

In an example embodiment, the second DRX configuration can comprise DRX related parameters for the terminal device 210-3. In some embodiments, the second DRX configuration can comprise a start time of an on-duration of a DRX cycle supported by the terminal device 210-3. Alternatively or in addition, a length of the on-duration of the DRX cycle supported by the terminal device 210-3 can be included in the second DRX configuration. In other example embodiments, the second DRX configuration can comprise a DRX cycle for the terminal device 210-3.

Alternatively, the second DRX configuration can comprise an accurate time period for resource assistance. The accurate time period for resource assistance used herein can refer to a time period that the terminal device 210-3 is within active-duration during this time period, and the terminal device 210-2 can provide a preferred resource(s) with time domain that is within this time period. In some example embodiments, the second DRX configuration can comprise both a start time and the end time of an active-duration associated with a DRX cycle implemented by the terminal device 210-3.

In other example embodiments, the second DRX configuration can comprise both a start time and an end time of an inactive-duration of a DRX cycle implemented by the terminal device 210-3. In some embodiments, the inactive-duration can comprise one or more off-durations and one or more-time durations of one or more active timers which can control the terminal device 210-1 not to receive. Alternatively, the second DRX configuration 410 can comprise the start time of the active-duration of the DRX cycle implemented by the terminal device 210-3 and length of the active-duration. As another example embodiment, the second DRX configuration can comprise the start time of the inactive-duration of the DRX cycle implemented by the terminal device 210-3 and length of the inactive-duration.

In other example embodiments, the configuration information can comprise an accurate time period for resource assistance for the sidelink UE pair (for example, the terminal devices 210-1 and 210-3). The accurate time period for resource assistance used herein can refer to a time period that both the terminal device 210-1 and the terminal device 210-3 are within active-duration during this time period, and the terminal device 210-2 can provide a preferred resource(s) of which time domain is within this time period. In some embodiments, the accurate time period for resource assistance can be determined by the terminal device 210-1 based on the first configuration and the second configuration. In this case, the configuration information can explicitly indicate the accurate time period for resource assistance. In other embodiments, the accurate time period for resource assistance for the sidelink UE pair can be determined by the terminal device 210-2 based on the first configuration and the second configuration included in the configuration information.

In some embodiments, the configuration information can comprise a start time of a common active-duration for the terminal devices 210-1 and 210-3, and an end time of the common active-duration for the terminal devices 210-1 and 210-3.

Additionally, the configuration information can comprise a start time of a common inactive-duration for the terminal devices 210-1 and 210-3 and an end time of the common inactive-duration for the terminal devices 210-1 and 210-3. Alternatively, the configuration information can comprise the start time and length of a common active-duration for the both terminal devices 210-1 and 210-3.

Additionally, the configuration information can comprise a start time of the common inactive-duration for the terminal devices 210-1 and 210-3 and length of the common inactive-duration for the terminal devices 210-1 and 210-3. Only as an example, the configuration information can comprise the start time 4130-2 of the common inactive-duration 4220-1 and the length of the common inactive-duration 4220-1. In addition, the configuration information can comprise the start time 4130-4 of the common inactive-duration 4220-2 and the length of the common inactive-duration 4220-2.

At block 520, the terminal device 210-1 receives a resource information from the terminal device 210-2. The resource information indicates the first set of resources. In some example embodiments, the resource information can be transmitted via a RRC signaling. Alternatively, a MAC CE signaling can be used for transmitting the resource information. In other example embodiments, the terminal device 210-1 can transmit the resource information via a PHY signaling (e.g. sidelink control information). It should be noted that the configuration information can be transmitted via any suitable signaling.

At block 530, the terminal device 210-1 determines a second set of resources based on the first set of resources and the configuration information. In some example embodiments, the terminal device 210-1 can also determine 3025 whether timeframe associated with the first set of resources being assigned overlaps with an inactive-duration of the DRX cycle of the terminal device 210-1 in time domain based on the first configuration information. For example, in some embodiments, the first configuration information can indicate an inactive-duration of the DRX cycle for the terminal device 210-1. The terminal device 210-1 can determine whether the timeframe associated with the first set of resources overlaps with the inactive-duration indicated in the first configuration information. If the timeframe associated with the first set of resources does not overlap with the inactive-duration of the DRX cycle for the terminal device 210-1, the terminal device 210-1 can determine 3045 the second set of resources from the first set of resources. By way of example, the terminal device 210-1 can perform sensing on the first set of resources to detect whether one or more resources in the first set of resources is/are available for the terminal device 210-1. If the terminal device 210-1 determines that one or more resources is/are not reserved by other terminal devices based on the results of a sensing procedure, such resource(s) can be regarded as an available resource(s). Then, the terminal device 210-1 can select one or more available resources in the first set of resources to be the second set of resources, which means the second set of resources is a subset of the first set of resources.

Alternatively, if timeframe associated with the first set of resources overlaps with an inactive-duration of the DRX cycle implemented by the terminal device 210-1, the terminal device 210-1 can determine a time duration which comprises an overlapped portion between the timeframe associated with active-duration and the first set of resources. Within such time duration, the terminal device 210-1 can perform sidelink reception. Moreover, such time duration can be regarded as a part of the active-duration of the terminal device 210-1. In some embodiments, the active-duration can be extended from the end time of a current on-duration of the DRX cycle supported by the terminal device 210-1 until a re-evaluation cut-off time point for the first set of resources. Alternatively, the active-duration can correspond to a time period spanning from a start time associated with the first set of resources to an end time of the first set of resources. The terminal device 210-1 can perform sensing on the first set of resource in the active-duration and determine 3045 the second set of resources based on the results of a sensing procedure, and also perform re-evaluation to the second set of resources.

In other example embodiments, if the first set of resources partially overlaps with the inactive-duration of the terminal device 210-1, the terminal device 210-1 can determine a subset of resources from the first set of resources that overlaps in time domain with an active-duration of the terminal device 210-1. The terminal device 210-1 can determine the subset of resources from the first set of resources at MAC layer of the terminal device 210-1. The MAC layer of the terminal device 210-1 can generate available resource information which indicates the subset of resources. In this situation, the terminal device 210-1 can determine 3045 the second set of resources from the aforementioned subset of resources that overlaps in time domain with an active-duration of the terminal device 210-1. For example, the terminal device 210-1 can determine the second set of resources based on sidelink traffic amount between the terminal device 210-1 and the terminal device 210-3.

In some example embodiments, if the first set of resources overlaps with the inactive-duration of the DRX cycle supported by the terminal device 210-1, the terminal device 210-1 cannot perform sensing on the first set of resources and can determine not to transmit data using resources from the first set of resources. In such situation, the terminal device 210-1 can generate a resource reselection indication to the terminal device 210-2, which informs the terminal device 210-2 that the first set of resources is not available and another set of resources is requested by the terminal device 210-1. Then, the terminal device 210-1 can transmit 3035 the resource reselection indication to the terminal device 210-2. In these embodiments, after the terminal device 210-2 receives the resource reselection indication from the terminal device 210-1, the terminal device 210-2 can allocate a third set of resources for the sidelink communication and transmit information indicating the third set of resources to the terminal device 210-1. The terminal device 210-1 can determine 3045 the second set of resources based on the third set of resources. In this situation, the second set of resources can be determined from the third set of resources in a similar approach as determining the second set of resources from the first set of resources. Alternatively, if the first set of resources overlaps with the inactive-duration of the terminal device 210-1, the terminal device 210-1 can randomly select the second set of resources from the first set of resources. In this case, the terminal device 201-1 can select the second set of resources randomly from the first set of resources without perform sensing procedure.

In some example embodiments, the terminal device 210-1 can determine whether timeframe associated with the first set of resources being assigned overlaps with an inactive-duration of the DRX cycle of the terminal device 210-3 in time domain based on the second configuration information. For example, in some embodiments, the second configuration information can indicate the inactive-duration of the DRX cycle for the terminal device 210-3, the terminal device 210-1 can determine whether the timeframe associated with the first set of resources overlaps with the inactive-duration indicated in the second configuration information. If the timeframe associated with the first set of resources does not overlap with the inactive-duration of the DRX cycle for the terminal device 210-3, the terminal device 210-1 can determine 3045 the second set of resources from the first set of resources. By way of example, the terminal device 210-1 can perform sensing on the first set of resources to detect whether one or more resources in the first set of resources is/are available for the terminal device 210-1. If the terminal device 210-1 determines that one or more resources is/are not reserved by other terminal devices based on the results of a sensing procedure, such resource(s) can be regarded as an available resource(s). Then, the terminal device 210-1 can select one or more available resources in the first set of resources to comprise the second set of resources, which means the second set of resources can be a subset of the first set of resources.

In other example embodiments, if the first set of resources partially overlaps with the inactive-duration (for example, the duration 4120-1 or 4120-2) of the DRX cycle supported by the terminal device 210-3, the terminal device 210-1 can determine a subset of resources from the first set of resources which overlaps, in time domain, with an active-duration of the DRX cycle of the terminal device 210-3. For example, the subset of resources can overlap with one or more of the durations 4110-1, 4110-2 and 4110-3. In some embodiments, the subset of resources can overlap with active-durations for both the terminal devices 210-1 and 210-3. The MAC layer of the terminal device 210-1 can generate available resource information which indicates the subset of resources. The available resource information can be provided to PHY layer of the terminal device 210-1 via a signaling between the MAC layer and the PHY layer. In this situation, the terminal device 210-1 can determine 3045 the second set of resources from the aforementioned subset of resources that overlaps in time domain with an active-duration of the terminal device 210-1. For example, the terminal device 210-1 can determine the second set of resources based on sidelink traffic information between the terminal device 210-1 and the terminal device 210-3. The sidelink traffic information can comprise characteristic parameters related to the sidelink traffic between the terminal device 210-1 and the terminal device 210-3. For example, the sidelink traffic information can comprise a maximum transport block size of the sidelink traffic.

In some example embodiments, if the first set of resources overlaps with the inactive-duration of the terminal device 210-3, the terminal device 210-3 cannot perform reception on the first set of resources and then the terminal device 210-1 can determine not to transmit data using resources from the first set of resources. In such situation, the terminal device 210-1 can generate a resource reselection indication to the terminal device 210-2 informing the terminal device 210-2 that the first set of resources is not available and another set of resources is requested by the terminal device 210-1. Then, the terminal device 210-1 can transmit 3035 the resource reselection indication to the terminal device 210-2. In these embodiments, after the terminal device 210-2 receives the resource reselection indication from the terminal device 210-1, the terminal device 210-2 can allocate a third set of resources for the sidelink communication and transmit information indicating the third set of resources to the terminal device 210-1. In these embodiments, after the terminal device 210-2 receives the resource reselection indication from the terminal device 210-1, the terminal device 210-1 can determine 3045 the second set of resources based on the third set of resources. In this situation, the second set of resources can be determined from the third set of resources in a similar approach as determining the second set of resources from the first set of resources. Alternatively, if the first set of resources overlaps with the inactive-duration of the terminal device 210-3, the terminal device 210-1 can randomly select the second set of resources from the first set of resources. In this case, the terminal device 201-1 can select the second set of resources randomly from the first set of resources without perform sensing procedure.

In some example embodiments, the terminal device 210-1 can determine whether timeframe associated with the first set of resources being assigned overlaps with an inactive-duration of the DRX cycle of the terminal device 210-3 in time domain based on the configuration information. For example, in some embodiments, the second configuration in the configuration information can indicate the inactive-duration of the DRX cycle for the terminal device 210-3, the terminal device 210-1 can determine whether the timeframe associated with the first set of resources overlaps with the inactive-duration indicated in the second configuration information since terminal device 210-1 has acquired the second configuration of the terminal device 210-3 when sidelink radio link is established between terminal device 201-1 and terminal device 210-3. If the timeframe associated with the first set of resources does not overlap with the inactive-duration of the DRX cycle for the terminal device 210-3, the terminal device 210-1 can determine 3045 the second set of resources from the first set of resources. By way of example, the terminal device 210-1 can perform sensing on the first set of resources to detect whether one or more resources in the first set of resources is/are available for the terminal device 210-1 based on the received SCI information which transmitted on PSCCH from other UEs. If the terminal device 210-1 determines that one or more resources is/are not used or reserved by other terminal devices based on the results of the sensing procedure, such resource(s) can be regarded as an available resource(s). Then, the terminal device 210-1 can select one or more available resources in the first set of resources to be the second set of resources, which means the second set of resources is a subset of the first set of resources.

In other example embodiments, if the first set of resources partially overlaps with the inactive-duration of the terminal device 210-3, the terminal device 210-1 can determine a subset of resources from the first set of resources which overlaps in time domain with an active-duration of the terminal device 210-3. For example, the subset of resources can overlap with one or more of the durations 4110-1, 4110-2 and 4110-3. In some embodiments, the subset of resources can overlap with active-durations that are common between both the terminal devices 210-1 and 210-3. In this situation, the terminal device 210-1 can determine 3045 the second set of resources from the subset of resources that overlaps in time domain with an active-duration of the terminal device 210-1. For example, the terminal device 210-1 can determine the second set of resources based on sidelink traffic size between the terminal device 210-1 and the terminal device 210-3.

In some example embodiments, if the first set of resources overlaps with the inactive-duration of the terminal device 210-3, the terminal device 210-3 cannot perform reception on the first set of resources and then the terminal device 210-1 can determine not to transmit data using resources from the first set of resources. In such situation, the terminal device 210-1 can generate a resource reselection indication to the terminal device 210-2 informing the terminal device 210-2 that the first set of resources is not available and another set of resources is requested by the terminal device 210-1. Then, the terminal device 210-1 can transmit 3035 the resource reselection indication to the terminal device 210-2. In these embodiments, after the terminal device 210-2 receives the resource reselection indication from the terminal device 210-1, the terminal device 210-2 can allocate a third set of resources for the sidelink communication and transmit information indicating the third set of resources to the terminal device 210-1. In these embodiments, after the terminal device 210-2 receives the resource reselection indication from the terminal device 210-1, the terminal device 210-1 can determine 3045 the second set of resources based on the third set of resources. In this situation, the second set of resources can be determined from the third set of resources in a similar approach as determining the second set of resources from the first set of resources. Alternatively, if the first set of resources overlaps with the inactive-duration of the terminal device 210-3, the terminal device 210-1 can randomly select the second set of resources from the first set of resources. In this case, the terminal device 201-1 can select the second set of resources randomly from the first set of resources without perform sensing procedure.

In other example embodiments, if the first set of resources overlaps with the inactive-duration of the terminal device 210-3, the terminal device 210-1 can transmit a wake-up information to the terminal device 210-3, where such information will request the terminal device 210-3 to perform reception during a time period that corresponds to the first set of resources. The wake-up information can indicate a time period during which the terminal device 210-3 needs to keep awake and perform sidelink reception. In other words, the terminal device 210-3 can perform mandatory reception during this time period. Only as an example, the time period indicated in the wake-up information can start from a time associated with a beginning of the first set of resources being available until a time when the first set of resources is no longer available. Alternatively, the time period can start from a time associated with a beginning of the second set of resources being available until domain time when the first set of resources is no longer available.

Alternatively, the wake-up information can comprise a timer. For example, the timer included in the wake-up information can start at the beginning of a time period that overlaps in time with the start of the first set of resources becoming available and lasts until the end of such period that corresponds in time with an end of the first set of resources being available. Alternatively, the timer can start from a beginning of a time period that overlaps in time with the second set of resources becoming available and lasts until an end of such period that corresponds to the second set of resources becoming unavailable. In other embodiments, the wake-up information can indicate the first set of resources. In order to secure the reception of the wake-up information, the transmission of the wake-up information can follow DRX cycle implemented by the terminal devices. For example, the wake-up information can be transmitted in an on-duration(s) of the DRX cycle implemented at the terminal device 210-3.

In some embodiments, the first set of resources can be provided to the terminal device 210-1 based on traffic priority. For example, the terminal device 210-2 can compare 3050 a priority of another terminal device (for example, the terminal device 210-4) with a priority of the terminal device 210-1. Alternatively, the terminal device 210-2 can compare the priority of the terminal device 210-4 with a threshold priority. If the priority of the terminal device 210-4 is higher than of the terminal device 210-1 or higher than the threshold priority, the terminal device 210-2 can generate an indication to the terminal device 210-1 to reselect a resource which is reserved in a particular time slot by the terminal device 210-1 if the terminal device 210-4 has indicated that such resource was reserved. The terminal device 210-2 can then transmit 3055 such indication to the terminal device 210-1. The pre-emption from the terminal device 210-4 to the terminal device 210-1 should be performed not later than a predetermined time before the particular slot which comprises the reserved resource.

In some example embodiments, the terminal device 210-1 can generate an indication which can inform the terminal device 210-2 of the second set of resources determined by the terminal device 210-1. In this case, the terminal device 210-1 can transmit such indication to the terminal device 210-2. In some example embodiments, the indication regarding the selected second set of resources can be transmitted via a RRC signaling. Alternatively, a MAC CE signaling can be used for transmitting the indication regarding the selected second set of resources. In other example embodiments, the terminal device 210-1 can transmit the indication regarding the selected second set of resources via a PHY signaling (e.g. Sidelink control information). It should be noted that the indication regarding the selected second set of resources can be transmitted via any suitable signaling. In order to secure the reception of the indication regarding the selected second set of resources, the transmission of the indication regarding the selected second set of resources can follow DRX cycle implemented by the terminal devices. For example, the configuration information can be transmitted in an on-duration(s) of the DRX cycle implemented at the terminal device 210-2.

Figure 6:
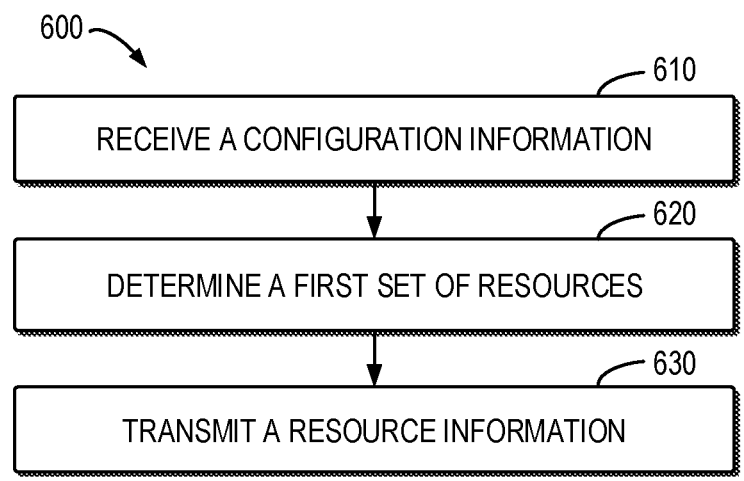
FIG. 6 illustrates a flowchart of an example method in accordance with an exemplary embodiment.

FIG. 6 illustrates a flowchart of an example method 600 according to some embodiments of the present disclosure. The method 500 can be performed by the terminal device 210-2 as shown in FIG. 2. It is to be understood that the method 600 can include additional blocks not shown and/or can omit some blocks as shown, and the scope of the present disclosure is not limited in this regard. For the purpose of discussion, the method 600 will be described from the perspective of the terminal device 210-2 with reference to FIG. 2.

At block 610, the terminal device 210-2 receives a configuration information from the terminal device 210-1. In some example embodiments, the terminal device 210-2 can receive a request (for example, an assistance request) for allocating resources from the terminal device 210-1. The configuration information can also be received as part of such request. In other embodiments, if there is no such request for allocating resources to the terminal device 210-2, the configuration information can be transmitted via a new signaling. For example, the configuration information can be received via a RRC signaling. Alternatively, a MAC control element (CE) signaling can be used for transmitting the configuration information. In other example embodiments, the terminal device 210-1 can transmit the configuration information via a PHY signaling (e.g. sidelink control information). It should be noted that the configuration information can be transmitted via any suitable signaling.

In some embodiments, if the configuration information has been updated, the updated configuration information needs to be transmitted to the terminal device 210-2. For example, if the configuration information is received in the request for allocating resources, the updated configuration information can be received as a part of such request as well. Alternatively, if there is no such request, the updated configuration information can be received via a new signaling. In this way, the terminal device 210-2 is able to allocate resources for sidelink communication more proper.

In an example embodiment, the configuration information can comprise a first DRX configuration for the terminal device 210-1. Alternatively or in addition, the configuration information can comprise a second DRX configuration for the terminal device 210-3.

In other example embodiments, the configuration information can also comprise an indication on whether the terminal device 210-2 should consider the DRX configuration when allocating resources for the sidelink communications. For example, the configuration information can comprise an indication regarding whether a first set of resources needs to be determined based on the first DRX configuration. Alternatively or in addition, the configuration information can comprise an indication regarding whether the first set of resources needs to be determined based on the second DRX configuration.

In some example embodiments, the first DRX configuration can comprise an identity of the terminal device 210-1. The identity can be any suitable identities that are able to identify the terminal device 210-1.

In an example embodiment, the first DRX configuration can comprise DRX related parameters for the terminal device 210-1. In some embodiments, the first DRX configuration can comprise a start time of an on-duration of the terminal device 210-1. Alternatively or in addition, a length of the on-duration of the terminal device 210-1 can also be included in the first DRX configuration. In other example embodiments, the first DRX configuration can comprise of a DRX cycle for the terminal device 210-1.

Alternatively, the first DRX configuration can comprise an accurate time period for resource assistance. The term "accurate time period for resource assistance" used herein can refer to a time period that the terminal device 210-1 is within active-duration during this time period, and the terminal device 210-2 can provide a preferred resource(s) with time domain of which is within this time period. In some example embodiments, the first DRX configuration can comprise both a start and an end time of an active-duration associated with DRX cycle implemented by the terminal device 210-1.

In other example embodiments, the first DRX configuration can comprise both a start and an end time of an inactive-duration of a DRX cycle supported by the terminal device 210-1. In some embodiments, the inactive-duration can comprise one or more off-durations and one or more time durations of one or more active timers which can control the terminal device 210-1 not to receive.

Alternatively, the first DRX configuration can comprise the start time of the active-duration of the terminal device 210-1 and length of the active-duration. As another example embodiment, the first DRX configuration can comprise the start time of the inactive-duration of the terminal device 210-1 and length of the inactive-duration.

In some example embodiments, the second DRX configuration can comprise an identity of the terminal device 210-3. The identity can be any suitable identities that are able to identify the terminal device 210-3.

In an example embodiment, the second DRX configuration can comprise DRX related parameters for the terminal device 210-3. In some embodiments, the second DRX configuration can comprise a start time of on-duration associated with a DRX cycle supported by the terminal device 210-3. Alternatively or in addition, a length of the on-duration can be included in the second DRX configuration. In other example embodiments, the second DRX configuration can comprise a DRX cycle for the terminal device 210-3.

Alternatively, the second DRX configuration can comprise an accurate time period for resource assistance. The term "accurate time period for resource assistance" used herein can refer to a time period that the terminal device 210-3 is within active-duration during this time period, and the terminal device 210-2 can provide a preferred resource(s) of which time domain is within this time period. In some example embodiments, the second DRX configuration can comprise both a start and an end times of an active-duration that corresponds to a DRX cycle implemented by the terminal device 210-3. In some embodiments, the active-duration can comprise one or more on-durations and one or more-time durations of one or more active timers which can control reception of the terminal device.

In other example embodiments, the second DRX configuration can comprise both a start and an end times of an inactive-duration of the DRX cycle supported by the terminal device 210-3. In some embodiments, the inactive-duration can comprise one or more off-durations and one or more-time durations of one or more active timers which can control the terminal device 210-1 not to receive. Alternatively, the second DRX configuration 410 can comprise the start time of the active-duration of the DRX cycle implemented by the terminal device 210-3 and length of the active-duration. As another example embodiment, the second DRX configuration can comprise the start time of the inactive-duration of the DRX cycle implemented by the terminal device 210-3 and length of the inactive-duration.

In other example embodiments, the configuration information can comprise an accurate time period for resource assistance for the sidelink UE pair (for example, the terminal devices 210-1 and 210-3). The term "accurate time period for resource assistance" used herein can refer to a time period that both the terminal device 210-1 and the terminal device 210-3 are within active-duration during this time period, and the terminal device 210-2 can provide a preferred resource(s) of which time domain is within this time period. The accurate time period for resource assistance for the sidelink UE pair can be determined at the terminal device 210-2 based on the configuration information.

In some embodiments, the configuration information can comprise a start and an end time of a common active-duration for both terminal devices 210-1 and 210-3.

Additionally, the configuration information can comprise a start and an end time of a common inactive-duration for both terminal devices 210-1 and 210-3. Alternatively, the configuration information can comprise the start time and the length of the active-duration of a DRX cycle supported by both terminal devices 210-1 and 210-3.

Additionally, the configuration information can comprise the start time and length of the common inactive-duration for both terminal devices 210-1 and 210-3.

At block 620, the terminal device 210-2 determines the first set of resources for the sidelink communication based on the configuration information. In some embodiments, the first set of resources can contain preferred resources for the sidelink communication. Alternatively, the first set of resources can contain avoided resources for the sidelink communication. The avoided resources can refer to the resources that the terminal device 210-1 will avoid selecting when determining the sidelink transmission resources. In an example embodiment, the first set of resources can be shared resources or resource pool for multiple terminal devices, for example, the terminal devices 210-1 and 210-4. Alternatively, the first set of resources can be a dedicated resource or dedicated resource pool for the terminal device 210-1. In this way, resource collision can be mitigated.

In some example embodiments, if the configuration information transmitted to terminal device 210-2 comprises an indication which indicates that the first set of resources do not need to be determined based on the first DRX configuration or the second DRX configuration, the terminal device 210-2 can determine the set of resources without considering the configuration information received. For example, the first set of resources can be determined based on results of the sensing procedure of the terminal device 210-2. The term "sensing" used herein can refer to a process where a device monitors a set of resources to identify is the set of resources is used by other devices. The term "results of sensing procedure" used herein can refer to a result indicating whether the sensed set of resources is available or unavailable for the device which performs the sensing. If the results of sensing procedure on a set of resources indicate that the terminal device 210-2 can transmit PSCCH, the set of resources can be selected as the first set of resources. If the results of sensing procedure on the set of resources indicate that the set of resources are used or reserved, the set of resources cannot be selected as the first set of resources.

Alternatively, the indication can indicate that the first set of resources needs to be determined based on the first DRX configuration. The terminal device 210-2 can determine the first set of resources which do not include the inactive time duration of the terminal device 210-1. For example, if the first set of resources includes preferred resources for the sidelink communication, the first set of resources can be assigned during the active-durations of the DRX cycle. If the first set of resources includes a set of avoided resources for the sidelink communication, timeframe associated with the first set of resources can overlap with the off-durations of the DRX cycle.

In some example embodiments, the indication can indicate that the first set of resources needs to be determined based on the second DRX configuration. The terminal device 210-2 can determine the first set of resources which do not include the inactive time of the terminal device 210-3. For example, if the first set of resources contains preferred resources for the sidelink communication, the first set of resources can be assigned during the active-durations of the DRX cycle. If, on the other hand, the first set of resources contains avoided resources for the sidelink communication, timeframe associated with the first set of resources can overlap with the off-durations of the DRX cycle.

In other embodiments, the indication can indicate that the first set of resources needs to be determined based on the first DRX configuration and the second DRX configuration. The terminal device 210-2 can determine the first set of resources that is within the overlapping active-durations period of the DRX cycle of the terminal device 210-1 and the DRX cycle of the terminal device 210-3. For example, if the first set of resources includes preferred resources for the sidelink communication, the first set of resources can be assigned during the overlapping active-durations of DRX cycles. If the first set of resources includes avoided resources for the sidelink communication, timeframe associated with the first set of resources can overlap with the overlapping off-durations of both DRX cycles.

At block 630, the terminal device 210-2 transmits a resource information to the terminal device 210-1. The resource information indicates the first set of resources. In some example embodiments, the resource information can be transmitted via a RRC signaling. Alternatively, a MAC CE signaling can be used for transmitting the resource information. In other example embodiments, the terminal device 210-1 can transmit the resource information via a PHY signaling (e.g. sidelink control information). It should be noted that the configuration information can be transmitted via any suitable signaling.

In some embodiments, the first set of resources can be provided to the terminal device 210-1 based on traffic priority. For example, the terminal device 210-2 can compare a priority of another terminal device (for example, the terminal device 210-4) with a priority of the terminal device 210-1. Alternatively, the terminal device 210-2 can compare the priority of the terminal device 210-4 with a threshold priority. If the priority of the terminal device 210-4 is higher than the terminal device 210-1 or higher than the threshold priority, the terminal device 210-2 can generate an indication to reselect a resource which is reserved in a particular slot by the terminal device 210-1 if terminal device 210-4 indicates to reserve it. The terminal device 210-2 can then transmit 3055 such indication to the terminal device 210-1. The pre-emption from the terminal device 210-4 to the terminal device 210-1 should be performed not later than a predetermined time before the particular slot which comprises the reserved resource.

In some example embodiments, the terminal device 210-2 can receive an indication from the terminal device 210-1, which can inform the terminal device 210-2 of the second set of resources which is determined by the terminal device 210-1. In some example embodiments, the indication regarding the selected second set of resources can be transmitted via a RRC signaling. Alternatively, a MAC CE signaling can be used for transmitting the indication regarding the selected second set of resources. In other example embodiments, the terminal device 210-1 can transmit the indication regarding the selected second set of resources via a PHY signaling (e.g. Sidelink control information). It should be noted that the indication regarding the selected second set of resources can be transmitted via any suitable signaling.

Example Apparatus

Figure 7:
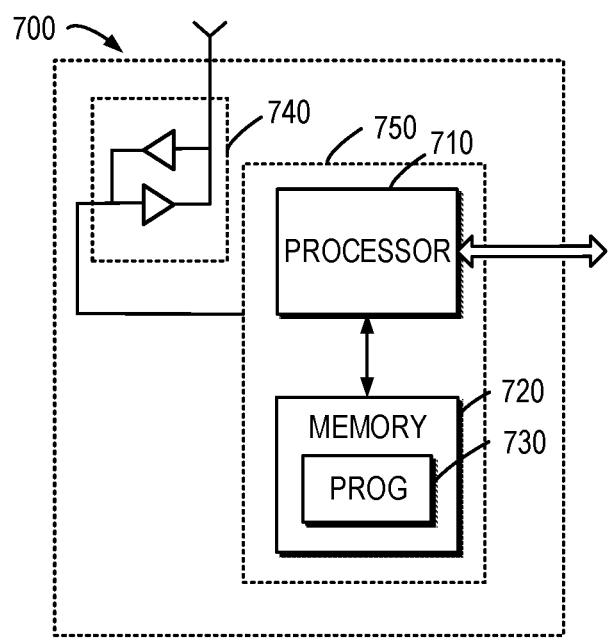
FIG. 7 illustrates a simplified block diagram of an apparatus that is suitable for implementing embodiments of the present disclosure.

FIG. 7 is a simplified block diagram of an apparatus 700 that is suitable for implementing embodiments of the present disclosure. The apparatus 700 can be considered as a further example implementation of the terminal device 210 as shown in FIG. 2. Accordingly, the apparatus 700 can be implemented at or as at least a part of the terminal device 210.

As shown, the apparatus 700 includes a processor 710, a memory 720 coupled to the processor 710, a suitable transmitter (TX) and receiver (RX) 740 coupled to the processor 710. The memory 710 stores at least a part of a program 730. The TX/RX 740 is for bidirectional communications. The TX/RX 740 is coupled to at least one antenna to facilitate communication, though, in practice, an Access Node mentioned in this application can have several antennas. The communication interface can represent any interface that is necessary for communication with other network elements, such as X2 interface for bidirectional communications between eNBs, Si interface for communication between a Mobility Management Entity (MME)/Serving Gateway (S-GW) and the eNB, Un interface for communication between the eNB and a relay node (RN), or Uu interface for communication between the eNB and a terminal device.

A program 730 is assumed to include program instructions that, when executed by the associated processor 710, enable the apparatus 700 to operate in accordance with the embodiments of the present disclosure, as discussed herein with reference to FIGS. 3-6. The embodiments herein can be implemented by computer software executable by the processor 710 of the apparatus 700, or by hardware, or by a combination of software and hardware. The processor 710 can be configured to implement various embodiments of the present disclosure. Furthermore, a combination of the processor 710 and memory 710 can form processing means 750 adapted to implement various embodiments of the present disclosure.

The memory 710 can be of any type suitable to the local technical network and can be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 710 is shown in the apparatus 700, there can be several physically distinct memory modules in the apparatus 700. The processor 710 can be of any type suitable to the local technical network, and can include one or more of general purpose computers, special purpose computers, microprocessors, digital signal processors (DSPs) and processors based on multicore processor architecture, as non-limiting examples. The apparatus 700 can have multiple processors, such as an application specific integrated circuit chip that is slaved in time to a clock which synchronizes the main processor.

In an exemplary embodiment, a method performed by a first terminal device, comprising: transmitting, to a second terminal device, a configuration information of discontinuous reception (DRX) associated with at least one of the first terminal device or a third terminal device; receiving, from the second terminal device, a resource information indicating a first set of resources allocated for a sidelink communication between the first terminal device and the third terminal device; and determining a second set of resources for performing the sidelink communication based on the first set of resources and the configuration information.

In an exemplary embodiment, the configuration information comprises at least one of: a first DRX configuration for the first terminal device or a second DRX configuration for the third terminal device.

In an exemplary embodiment, the configuration information further comprises an indication regarding whether the first set of resources needs to be determined based on at least one of: the first DRX configuration for the first terminal device or the second DRX configuration for the third terminal device.

In an exemplary embodiment, the first DRX configuration comprises an identity of the first terminal device and one or more of: a start time of on-duration of the first terminal device, a length of the on-duration of the first terminal device, or a DRX cycle of the first terminal device; or the first DRX configuration comprises an identity of the first terminal device and one or more of: a start time of an active-duration of the first terminal device and an end time of the active-duration of the first terminal device, a start time of an inactive-duration of the first terminal device and an end time of the inactive-duration of the first terminal device, the start time of the active-duration of the first terminal device and length of the active-duration of the first terminal device, or the start time of the inactive-duration of the first terminal device and length of the inactive-duration of the first terminal device.

In an exemplary embodiment, the second DRX configuration comprises an identity of the third terminal device and one or more of: a start time of on-duration of the third terminal device, a length of the on-duration of the third terminal device, or a DRX cycle of the third terminal device; or the second DRX configuration comprises an identity of the third terminal device and one or more of: a start time of an active-duration of the third terminal device and an end time of the active-duration of the third terminal device, a start time of an inactive-duration of the third terminal device and an end time of the inactive-duration of the third terminal device, the start time of the active-duration of the third terminal device and length of the active-duration of the third terminal device, or the start time of the inactive-duration of the third terminal device and length of the inactive-duration of the third terminal device.

In an exemplary embodiment, the configuration information comprises one or more of: a start time of an active-duration for the first terminal device and the third terminal device and an end time of the active-duration for the first terminal device and the third terminal device, a start time of an inactive-duration for the first terminal device and the third terminal device and an end time of the inactive-duration for the first terminal device and the third terminal device, the start time of the active-duration for the first terminal device and the third terminal device and length of the active-duration for the first terminal device and the third terminal device, or the start time of the inactive-duration for the first terminal device and the third terminal device and length of the inactive-duration for the first terminal device and the third terminal device.

In an exemplary embodiment, transmitting the configuration information comprises: transmitting, to the second terminal device, the configuration information with a request for the first set of resources; or transmitting, to the second terminal device, the configuration information via a radio resource control (RRC) signaling, a medium access control (MAC) control element (CE) signaling, or a physical layer signaling.

In an exemplary embodiment, transmitting the configuration information comprises: in accordance with a determination that the configuration of DRX has been updated previously, transmitting the configuration information to the second terminal device.

In an exemplary embodiment, determining the second set of resources comprises: determining whether the first set of resources overlaps, in time domain, with an inactive-duration of the first terminal device; in accordance with a determination that the first set of resources overlaps with the inactive-duration of the first terminal device, determining a time duration which comprises an overlapped portion between the inactive-duration and the first set of resources as an active-duration of the first terminal device; performing resource evaluation in the active-duration; and determining the second set of resources based on the resource evaluation.

In an exemplary embodiment, the active-duration of the first terminal device is from an end time of a current on-duration of the first terminal device to a reevaluation cut-off time point of the first set of resources, or the active-duration of the first terminal device is from a start time of the first set of resources to an end time of the first set of resources.

In an exemplary embodiment, the method further comprises determining whether the first set of resources overlaps, in time domain, with an inactive-duration of the third terminal device; and in accordance with a determination that the first set of resources overlaps with the inactive-duration of the third terminal device, transmitting a wake-up information to the third terminal device to enforce the third terminal device performing reception during a time period of the first set of resources.

In an exemplary embodiment, the wake-up information indicating at least one of: a time period during which the third terminal device needs to wake up, the first set of resources, or a timer which starts from a beginning of a time period that overlaps in time a start of the first set of resources being available and last until an end of the time period that corresponds in time with an end of the first set of resources being available.

In an exemplary embodiment, determining the second set of resources comprises: determining whether the first set of resources overlaps with an inactive-duration of the first terminal device; in accordance with a determination that the first set of resources partially overlaps with the inactive-duration of the first terminal device, determines a plurality of resources from the first set of resources, the plurality of resources overlapping in time domain with an active-duration of the first terminal device in a medium access control (MAC) layer at the first terminal device; providing available resource information indicating the plurality of resources from the MAC layer to a physical layer at the first terminal device; and determining the second set of resources from the plurality of resources.

In an exemplary embodiment, determining the second set of resources comprises: in accordance with a determination that the first set of resources overlaps with an inactive-duration of the first terminal device or an inactive-duration of the third terminal device, randomly select the second set of resources from the first set of resources.

In an exemplary embodiment, the method further comprises in accordance with a determination that the first set of resources overlaps with an inactive-duration of the first terminal device or an inactive-duration of the third terminal device, transmitting a resource reselection indication to the second terminal device.

In an exemplary embodiment, the method further comprises receiving, from the second terminal device, an indication to reselect a resource which is reserved by a fourth terminal device with a higher priority than the first terminal device.

In an exemplary embodiment, transmitting the configuration information comprises: transmitting the configuration information comprising an indication regarding whether the first set of resources needs to be determined based on the configuration information.

In an exemplary embodiment, a method performed by a second terminal device, comprising: receiving, from a first terminal device, a configuration information of discontinuous reception (DRX) associated with at least one of the first terminal device or a third terminal device; determining, based on the configuration information, a first set of resources allocated for a sidelink communication between the first terminal device and the third terminal device; and transmitting, to the first terminal device, a resource information indicating the first set of resources.

In an exemplary embodiment, the configuration information comprises at least one of: a first DRX configuration for the first terminal device and a second DRX configuration for the third terminal device.

In an exemplary embodiment, the first DRX configuration comprises an identity of the first terminal device and one or more of: a start time of on-duration of the first terminal device, a length of the on-duration of the first terminal device, or a DRX cycle of the first terminal device; or the first DRX configuration comprises an identity of the first terminal device and one or more of: a start time of an active-duration of the first terminal device and an end time of the active-duration of the first terminal device, a start time of an inactive-duration of the first terminal device and an end time of the inactive-duration of the first terminal device, the start time of the active-duration of the first terminal device and length of the active-duration of the first terminal device, or the start time of the inactive-duration of the first terminal device and length of the inactive-duration of the first terminal device.

In an exemplary embodiment, the second DRX configuration comprises an identity of the third terminal device and one or more of: a start time of on-duration of the third terminal device, a length of the on-duration of the third terminal device, or a DRX cycle of the third terminal device; or the second DRX configuration comprises an identity of the third terminal device and one or more of: a start time of an active-duration of the third terminal device and an end time of the active-duration of the third terminal device, a start time of an inactive-duration of the third terminal device and an end time of the inactive-duration of the third terminal device, the start time of the active-duration of the third terminal device and length of the active-duration of the third terminal device, or the start time of the inactive-duration of the third terminal device and length of the inactive-duration of the third terminal device.

In an exemplary embodiment, the configuration information comprises one or more of: a start time of an active-duration for the first terminal device and the third terminal device and an end time of the active-duration for the first terminal device and the third terminal device, a start time of an inactive-duration for the first terminal device and the third terminal device and an end time of the inactive-duration for the first terminal device and the third terminal device, the start time of the active-duration for the first terminal device and the third terminal device and length of the active-duration for the first terminal device and the third terminal device, or the start time of the inactive-duration for the first terminal device and the third terminal device and length of the inactive-duration for the first terminal device and the third terminal device.

In an exemplary embodiment, receiving the configuration information comprises: receiving, from the first terminal device, the configuration information with a request for the first set of resources; or receiving, from the first terminal device, the configuration information via a radio resource control (RRC) signaling, a medium access control (MAC) control element (CE) signaling, or a physical layer signaling.

In an exemplary embodiment, determining the first set of resources comprises: determining the first set of resources which is non-overlapping in time domain with at least one of: an inactive-duration of the first terminal device indicated in the configuration information, or an inactive-duration of the third terminal device indicated in the configuration information.

In an exemplary embodiment, the method further comprises in accordance with a determination that the first set of resources overlaps with an inactive-duration of the first terminal device or in accordance with a determination that the first set of resources overlaps with an inactive-duration of the third terminal device, receiving a resource reselection indication from the first terminal device.

In an exemplary embodiment, the method further comprises comparing a first priority of first terminal device with a second priority of a fourth terminal device; or comparing the second priority of the fourth terminal device with a threshold priority; and in accordance with a determination that the second priority is higher than the first priority or the second priority is higher than the threshold priority, transmitting, to the first terminal device, an indication to reselect a resource which is reserved by the fourth terminal device.

In an exemplary embodiment, receiving the configuration information comprises: receiving the configuration information comprising an indication regarding whether the first set of resources needs to be determined based on at least one of: a first DRX configuration for the first terminal device or a second DRX configuration for the third terminal device indicated in the configuration information.

Generally, various embodiments of the present disclosure can be implemented in hardware or special purpose circuits, software, logic or any combination thereof. Some aspects can be implemented in hardware, while other aspects can be implemented in firmware or software which can be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein can be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3-6. Generally, program modules include routines, programs, libraries, objects, classes, components, data structures, or the like that perform particular tasks or implement particular abstract data types. The functionality of the program modules can be combined or split between program modules as desired in various embodiments. Machine-executable instructions for program modules can be executed within a local or distributed device. In a distributed device, program modules can be located in both local and remote storage media.

Program code for carrying out methods of the present disclosure can be written in any combination of one or more programming languages. These program codes can be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code can execute entirely on a machine, partly on the machine, as a stand-alone software package, partly on the machine and partly on a remote machine or entirely on the remote machine or server.

The above program code can be embodied on a machine readable medium, which can be any tangible medium that can contain, or store a program for use by or in connection with an instruction execution system, apparatus, or device. The machine readable medium can be a machine readable signal medium or a machine readable storage medium. A machine readable medium can include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing can be advantageous. Likewise, while several specific implementation details are contained in the above discussions, these should not be construed as limitations on the scope of the present disclosure, but rather as descriptions of features that can be specific to particular embodiments. Certain features that are described in the context of separate embodiments can also be implemented in combination in a single embodiment. Conversely, various features that are described in the context of a single embodiment can also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

Reference to an element in the singular is not intended to mean "one and only one" unless explicitly so stated, but rather is intended to mean "one or more." Where a phrase similar to "any combination of A, B, C" is used herein, it is intended that the phrase be interpreted to mean that A alone can be present in an embodiment, B alone can be present in an embodiment, C alone can be present in an embodiment, and that any combination of the elements A, B, and C can be present in a single embodiment. For example, any combination of the elements A, B, and C includes the combinations of: A and B, A and C, B and C, and A and B and C can each be present in an embodiment.

When elements, such as A and B, are described as being "A/B" or a "/" is used, then the description is intended to cover all the following combinations: A alone, B alone, or A and B together.

What is claimed is:

1. A user equipment (UE) at a first terminal device, comprising:
   at least one memory; and
   at least one processor coupled with the at least one memory and configured to cause the UE to:
      transmit, to a second terminal device, a configuration information of discontinuous reception (DRX) associated with at least one of the first terminal device or a third terminal device;
      receive, from the second terminal device, a resource information indicating a first set of resources allocated for a sidelink communication between the first terminal device and the third terminal device; and
      determine a second set of resources for performing the sidelink communication based on the first set of resources and the configuration information.

2. The UE of claim 1, wherein the configuration information comprises at least one of:
   a first DRX configuration for the first terminal device or a second DRX configuration for the third terminal device.

3. The UE of claim 2, wherein the configuration information further comprises an indication regarding whether the first set of resources needs to be determined based on at least one of:
   the first DRX configuration for the first terminal device or the second DRX configuration for the third terminal device;
   wherein the first DRX configuration comprises an identity of the first terminal device and one or more of:
      a start time of on-duration of the first terminal device, a length of the on-duration of the first terminal device, or a DRX cycle of the first terminal device; or
   wherein the first DRX configuration comprises an identity of the first terminal device and one or more of:
      a start time of an active-duration of the first terminal device and an end time of the active-duration of the first terminal device, a start time of an inactive-duration of the first terminal device and an end time of the inactive-duration of the first terminal device, the start time of the active-duration of the first terminal device and length of the active-duration of the first terminal device, or the start time of the inactive-duration of the first terminal device and length of the inactive-duration of the first terminal device;

wherein the second DRX configuration comprises an identity of the third terminal device and one or more of:

a start time of on-duration of the third terminal device, a length of the on-duration of the third terminal device, or a DRX cycle of the third terminal device; or wherein the second DRX configuration comprises an identity of the third terminal device and one or more of:

a start time of an active-duration of the third terminal device and an end time of the active-duration of the third terminal device, a start time of an inactive-duration of the third terminal device and an end time of the inactive-duration of the third terminal device, the start time of the active-duration of the third terminal device and length of the active-duration of the third terminal device, or the start time of the inactive-duration of the third terminal device and length of the inactive-duration of the third terminal device; or wherein the configuration information comprises one or more of:

a start time of an active-duration for the first terminal device and the third terminal device and an end time of the active-duration for the first terminal device and the third terminal device, a start time of an inactive-duration for the first terminal device and the third terminal device and an end time of the inactive-duration for the first terminal device and the third terminal device, the start time of the active-duration for the first terminal device and the third terminal device and length of the active-duration for the first terminal device and the third terminal device, or the start time of the inactive-duration for the first terminal device and the third terminal device and length of the inactive-duration for the first terminal device and the third terminal device.

4. The UE of claim 1, wherein transmitting the configuration information comprises one of:

in accordance with a determination that the configuration of DRX has been updated previously, transmitting the configuration information to the second terminal device;

in accordance with a determination that a request for allocating resources for the sidelink communication is to be transmitted, transmitting, to the second terminal device, the configuration information in the request; or transmitting, to the second terminal device, the configuration information via a radio resource control (RRC) signaling, a medium access control (MAC) control element (CE) signaling, or a physical layer signaling.

5. The UE of claim 1, wherein determining the second set of resources comprises:

determining whether the first set of resources overlaps, in time domain, with an inactive-duration of the first terminal device;

in accordance with a determination that the first set of resources overlaps with the inactive-duration of the first terminal device, determining a time duration which comprises an overlapped portion between the inactive-duration and the first set of resources;

performing resource evaluation in the time duration;

determining the second set of resources based on the resource evaluation; and wherein the time duration of the first terminal device is from an end time of a current on-duration of the first terminal device to a reevaluation cut-off time point of the first set of resources, or the time duration of the first terminal device is from a start time of the first set of resources to an end time of the first set of resources.

6. The UE of claim 1, wherein the at least one processor is configured to cause the UE to:

determine whether the first set of resources overlaps, in time domain, with an inactive-duration of the third terminal device; and in accordance with a determination that the first set of resources overlaps with the inactive-duration of the third terminal device, transmit a wake-up information to the third terminal device to enforce the third terminal device performing reception during a time period of the first set of resources;

wherein the wake-up information indicating at least one of:

a time period during which the third terminal device needs to wake up, the first set of resources, or a timer which starts from a beginning of a period of the first set of resources until an end of the period of the first set of resources.

7. The UE of claim 1, wherein determining the second set of resources comprises:

determining whether the first set of resources overlaps with an inactive-duration of the first terminal device;

in accordance with a determination that the first set of resources partially overlaps with the inactive-duration of the first terminal device, determines a subset of resources from the first set of resources, the subset of resources overlapping in time domain with an active-duration of the first terminal device; and determining the second set of resources from a plurality of resources.

8. The UE of claim 1, wherein the at least one processor is configured to cause the UE to:

in accordance with a determination that the first set of resources overlaps with an inactive-duration of the first terminal device or an inactive-duration of the third terminal device, transmit a resource reselection indication to the second terminal device.

9. A user equipment (UE) at a second terminal device, comprising:

at least one memory; and at least one processor coupled with the at least one memory and configured to cause the UE to:

receive, from a first terminal device, a configuration information of discontinuous reception (DRX) associated with at least one of the first terminal device or a third terminal device;

determine, based on the configuration information, a first set of resources allocated for a sidelink communication between the first terminal device and the third terminal device; and transmitting transmit, to the first terminal device, a resource information indicating the first set of resources.

10. The UE of claim 9, wherein the configuration information comprises at least one of:
a first DRX configuration for the first terminal device and a second DRX configuration for the third terminal device.

11. The UE of claim 10, wherein the configuration information further comprises an indication regarding whether the first set of resources needs to be determined based on at least one of: the first DRX configuration for the first terminal device or the second DRX configuration for the third terminal device;
wherein the first DRX configuration comprises an identity of the first terminal device and one or more of: a start time of on-duration of the first terminal device, a length of the on-duration of the first terminal device, or a DRX cycle of the first terminal device; or
wherein the first DRX configuration comprises an identity of the first terminal device and one or more of:
a start time of an active-duration of the first terminal device and an end time of the active-duration of the first terminal device,
a start time of an inactive-duration of the first terminal device and an end time of the inactive-duration of the first terminal device,
the start time of the active-duration of the first terminal device and length of the active-duration of the first terminal device, or
the start time of the inactive-duration of the first terminal device and length of the inactive-duration of the first terminal device;
wherein the second DRX configuration comprises an identity of the third terminal device and one or more of:
a start time of on-duration of the third terminal device, a length of the on-duration of the third terminal device, or a DRX cycle of the third terminal device; or
wherein the second DRX configuration comprises an identity of the third terminal device and one or more of:
a start time of an active-duration of the third terminal device and an end time of the active-duration of the third terminal device,
a start time of an inactive-duration of the third terminal device and an end time of the inactive-duration of the third terminal device,
the start time of the active-duration of the third terminal device and length of the active-duration of the third terminal device, or
the start time of the inactive-duration of the third terminal device and length of the inactive-duration of the third terminal device; or
wherein the configuration information comprises one or more of:
a start time of an active-duration for the first terminal device and the third terminal device and an end time of the active-duration for the first terminal device and the third terminal device,
a start time of an inactive-duration for the first terminal device and the third terminal device and an end time of the inactive-duration for the first terminal device and the third terminal device,
the start time of the active-duration for the first terminal device and the third terminal device and length of the active-duration for the first terminal device and the third terminal device, or
the start time of the inactive-duration for the first terminal device and the third terminal device and length of the inactive-duration for the first terminal device and the third terminal device.

12. The UE of claim 9, wherein receiving the configuration information comprises:
receiving, from the first terminal device, the configuration information with a request for the first set of resources; or
receiving, from the first terminal device, the configuration information via a radio resource control (RRC) signaling, a medium access control (MAC) control element (CE) signaling, or a physical layer signaling.

13. The UE of claim 9, wherein determining the first set of resources comprises:
determining the first set of resources which is non-overlapping in time domain with at least one of:
an inactive-duration of the first terminal device indicated in the configuration information, or
an inactive-duration of the third terminal device indicated in the configuration information.

14. The UE of claim 9, wherein the at least one processor is configured to cause the UE to:
in accordance with a determination that the first set of resources overlaps with an inactive-duration of the first terminal device or in accordance with a determination that the first set of resources overlaps with an inactive-duration of the third terminal device, receive a resource reselection indication from the first terminal device.

15. A processor of a first terminal device for wireless communication, comprising:
at least one controller coupled with at least one memory and configured to cause the processor to:
transmit, to a second terminal device, a configuration information of discontinuous reception (DRX) associated with at least one of the first terminal device or a third terminal device;
receive, from the second terminal device, a resource information indicating a first set of resources allocated for a sidelink communication between the first terminal device and the third terminal device; and
determine a second set of resources for performing the sidelink communication based on the first set of resources and the configuration information.

16. The processor of claim 15, wherein the configuration information comprises at least one of:
a first DRX configuration for the first terminal device or a second DRX configuration for the third terminal device.

17. The processor of claim 16, wherein the configuration information further comprises an indication regarding whether the first set of resources needs to be determined based on at least one of:
the first DRX configuration for the first terminal device or the second DRX configuration for the third terminal device;
wherein the first DRX configuration comprises an identity of the first terminal device and one or more of:
a start time of on-duration of the first terminal device, a length of the on-duration of the first terminal device, or a DRX cycle of the first terminal device; or
wherein the first DRX configuration comprises an identity of the first terminal device and one or more of:
a start time of an active-duration of the first terminal device and an end time of the active-duration of the first terminal device, a start time of an inactive-duration of the first terminal device and an end time of the inactive-duration of the first terminal device, the start time of the active-duration of the first terminal device and length of the active-duration of the first terminal device, or the start time of the inactive-duration of the first terminal device and length of the inactive-duration of the first terminal device;

wherein the second DRX configuration comprises an identity of the third terminal device and one or more of: a start time of on-duration of the third terminal device, a length of the on-duration of the third terminal device, or a DRX cycle of the third terminal device; or wherein the second DRX configuration comprises an identity of the third terminal device and one or more of:

a start time of an active-duration of the third terminal device and an end time of the active-duration of the third terminal device, a start time of an inactive-duration of the third terminal device and an end time of the inactive-duration of the third terminal device, the start time of the active-duration of the third terminal device and length of the active-duration of the third terminal device, or the start time of the inactive-duration of the third terminal device and length of the inactive-duration of the third terminal device; or wherein the configuration information comprises one or more of:

a start time of an active-duration for the first terminal device and the third terminal device and an end time of the active-duration for the first terminal device and the third terminal device, a start time of an inactive-duration for the first terminal device and the third terminal device and an end time of the inactive-duration for the first terminal device and the third terminal device, the start time of the active-duration for the first terminal device and the third terminal device and length of the active-duration for the first terminal device and the third terminal device, or the start time of the inactive-duration for the first terminal device and the third terminal device and length of the inactive-duration for the first terminal device and the third terminal device.

18. A processor of a second terminal device for wireless communication, comprising:

at least one controller coupled with at least one memory and configured to cause the processor to:

receive, from a first terminal device, a configuration information of discontinuous reception (DRX) associated with at least one of the first terminal device or a third terminal device;

determine, based on the configuration information, a first set of resources allocated for a sidelink communication between the first terminal device and the third terminal device; and transmit, to the first terminal device, a resource information indicating the first set of resources.

19. The processor of claim 18, wherein the configuration information comprises at least one of:

a first DRX configuration for the first terminal device and a second DRX configuration for the third terminal device.

20. The processor of claim 19, wherein the configuration information further comprises an indication regarding whether the first set of resources needs to be determined based on at least one of: the first DRX configuration for the first terminal device or the second DRX configuration for the third terminal device;

wherein the first DRX configuration comprises an identity of the first terminal device and one or more of: a start time of on-duration of the first terminal device, a length of the on-duration of the first terminal device, or a DRX cycle of the first terminal device; or wherein the first DRX configuration comprises an identity of the first terminal device and one or more of:

a start time of an active-duration of the first terminal device and an end time of the active-duration of the first terminal device, a start time of an inactive-duration of the first terminal device and an end time of the inactive-duration of the first terminal device, the start time of the active-duration of the first terminal device and length of the active-duration of the first terminal device, or the start time of the inactive-duration of the first terminal device and length of the inactive-duration of the first terminal device;

wherein the second DRX configuration comprises an identity of the third terminal device and one or more of: a start time of on-duration of the third terminal device, a length of the on-duration of the third terminal device, or a DRX cycle of the third terminal device; or wherein the second DRX configuration comprises an identity of the third terminal device and one or more of:

a start time of an active-duration of the third terminal device and an end time of the active-duration of the third terminal device, a start time of an inactive-duration of the third terminal device and an end time of the inactive-duration of the third terminal device, the start time of the active-duration of the third terminal device and length of the active-duration of the third terminal device, or the start time of the inactive-duration of the third terminal device and length of the inactive-duration of the third terminal device; or wherein the configuration information comprises one or more of:

a start time of an active-duration for the first terminal device and the third terminal device and an end time of the active-duration for the first terminal device and the third terminal device, a start time of an inactive-duration for the first terminal device and the third terminal device and an end time of the inactive-duration for the first terminal device and the third terminal device, the start time of the active-duration for the first terminal device and the third terminal device and length of the active-duration for the first terminal device and the third terminal device, or the start time of the inactive-duration for the first terminal device and the third terminal device and length of the inactive-duration for the first terminal device and the third terminal device.

* * * * *